(12) United States Patent
Todasco

(10) Patent No.: US 10,743,162 B2
(45) Date of Patent: Aug. 11, 2020

(54) AGGREGATION SYSTEM FOR ITEM RETRIEVAL

(71) Applicant: PAYPAL, INC., San Jose, CA (US)

(72) Inventor: Michael Charles Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 496 days.

(21) Appl. No.: 15/244,533

(22) Filed: Aug. 23, 2016

(65) Prior Publication Data
US 2018/0060846 A1 Mar. 1, 2018

(51) Int. Cl.
| H04W 4/80 | (2018.01) |
| H04W 4/02 | (2018.01) |
| G06Q 20/32 | (2012.01) |
| G06Q 20/08 | (2012.01) |

(52) U.S. Cl.
CPC .......... *H04W 4/80* (2018.02); *G06Q 20/0855* (2013.01); *G06Q 20/3224* (2013.01); *G06Q 20/3274* (2013.01); *G06Q 20/3278* (2013.01); *H04W 4/023* (2013.01)

(58) Field of Classification Search
CPC .......... H04W 4/02; G06Q 30/02; G06Q 20/18
USPC .......................................... 455/456.3; 705/21
See application file for complete search history.

(56) References Cited

U.S. PATENT DOCUMENTS

| 8,781,622 B2* | 7/2014 | Mockus .................. G06Q 20/18 700/237 |
| 8,788,686 B1* | 7/2014 | Khan .................... H04L 67/148 370/229 |
| 9,219,980 B2* | 12/2015 | Moldavsky ........ G06Q 30/0261 |
| 9,472,043 B2* | 10/2016 | Mockus ................. G06Q 20/18 |
| 9,693,190 B2* | 6/2017 | Moldavsky ........ G06Q 30/0261 |
| 2012/0029691 A1* | 2/2012 | Mockus ................. G06Q 20/18 700/232 |
| 2013/0166332 A1* | 6/2013 | Hammad ............... G06Q 40/10 705/5 |
| 2013/0218721 A1* | 8/2013 | Borhan ................ G06Q 20/322 705/26.41 |
| 2015/0005933 A1* | 1/2015 | Mockus ................. G06Q 20/18 700/232 |
| 2015/0073907 A1* | 3/2015 | Purves .................. G06Q 20/32 705/14.58 |
| 2015/0080031 A1* | 3/2015 | Moldavsky ........ G06Q 30/0261 455/456.3 |
| 2015/0080032 A1* | 3/2015 | Moldavsky ........ G06Q 30/0261 455/456.3 |
| 2015/0105901 A1* | 4/2015 | Joshi ...................... G06Q 20/18 700/232 |
| 2015/0356801 A1* | 12/2015 | Nitu .................... G07C 9/00912 340/5.61 |

(Continued)

*Primary Examiner* — Oluseye Iwarere

(74) *Attorney, Agent, or Firm* — Haynes and Boone, LLP

(57) ABSTRACT

Various systems, mediums, and methods herein describe mechanisms that enable a user to send a request from her smartphone to multiple retriever devices, such that an item may be retrieved for the user. At least one of the users of the retriever devices may accept the request to retrieve the item for the requesting user. The retrieving device may send an acceptance message to the requester's smartphone to confirm that the item may be retrieved for the requesting user. In such instances, a retrieval fee may be transferred to the retrieving user's account accessible with the retriever device that accepted the request.

20 Claims, 13 Drawing Sheets

(56) References Cited

U.S. PATENT DOCUMENTS

| | | | |
|---|---|---|---|
| 2016/0078434 A1* | 3/2016 | Huxham | G07F 19/204 |
| | | | 705/71 |
| 2016/0119750 A1* | 4/2016 | Moldavsky | G06Q 30/0261 |
| | | | 455/456.3 |
| 2017/0148002 A1* | 5/2017 | Stock | G06Q 20/18 |

* cited by examiner

AGGREGATION SYSTEM FOR ITEM RETRIEVAL

BACKGROUND

In various circumstances, people are commonly found waiting in lines. For example, people may wait in a line to get tickets at a kiosk, a ticket counter, and/or a check-out station, among various other locations, possibly in public areas. In some instances, people may wait in such lines to get tickets for public transportation, such as train tickets, bus tickets, ferry passes, and/or airline boarding passes, among other possible items. Further, people may also wait in lines to get items at a store, possibly where people may wait in a line to checkout items at a given checkout counter. Yet further, people may also wait in a line to get food at a fast casual restaurant, possibly where the each patron may wait in the line to make an order for food at the restaurant's ordering counter. As contemplated above, there are various scenarios where users may have to wait in lines, particularly making such experiences undesirable for the users. Further, considering the number of times that the users may wait in lines throughout a given day, the user experiences may be increasingly more inconvenient, inefficient, and probably undesirable.

As demonstrated in the various scenarios considered above, there is much need for improving various processes related to people waiting in lines, which can be achieved through technological advancements in various aspects of computer technology in the realm of computer networks. For example, various improvements may be achieved with systems, mobile devices, and/or network topologies associated with people waiting in lines, various wait times, and/or other delays, as described in the scenarios above.

Figure 1A:
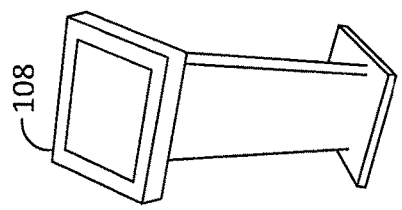
FIG. 1A illustrates an exemplary system, according to an embodiment.
Figure 1A:
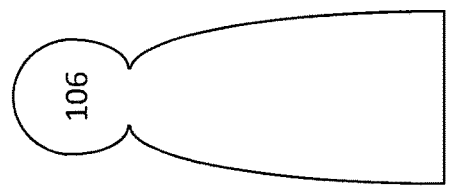
Figure 1A:
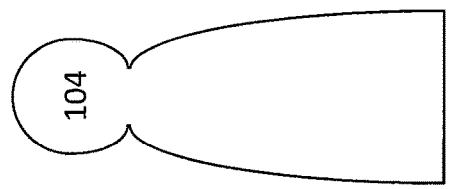
Figure 1A:
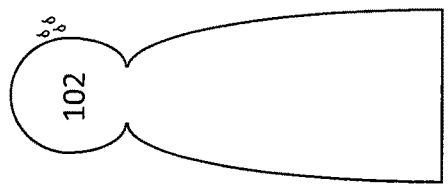

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described in the scenarios above, there may be various circumstances where a user may have to wait for an item, such as the user waiting in a line to get a train ticket from a ticket kiosk, as contemplated above. However, consider a scenario where the user is waiting towards the back of a longer line to get the train ticket from the kiosk. Further, consider that the user is in a hurry to get a ticket to get on the next train, possibly approaching the train station. As such, the user may be waiting in the line, observing each individual person ahead in the line go through the same process of obtaining a ticket. For example, the process may involve selecting menu options displayed by the kiosk, inserting funds or a credit card into the kiosk, and retrieving a ticket from the kiosk. Thus, the user may be painfully watching each individual go through the same process, possibly knowing that the user is likely to miss the approaching train due to the delay in waiting for each individual complete the process. In such circumstances, the user may find the experience undesirable based on the inconvenience and/or inefficiency involved with each individual ahead having to complete the same process to receive a single ticket.

In view of such scenarios above, the systems described herein may resolve the problems associated with the user waiting in various lines contemplated above. For example, consider the scenario of the user waiting towards the back of the longer line, possibly referred to as the requesting user. In practice, the requesting user may be able to open a mobile application on a smartphone, where the application may be configured to request, e.g., ping, message, and/or communicate with, other mobile devices of users ahead in the line. In particular, the requesting user may request the other users to purchase a ticket for the requesting user. In various circumstances, the users ahead in the line may be selected by the requesting user, and in some instances, the users ahead in the line may be identified by the system. In some instances, the system may intelligently locate the other users ahead in the line based on the geo-location of the requesting user's smartphone and possibly also the geo-locations of the other users' mobile devices ahead in the line, where the system may display the other users on the requesting user's smartphone. Further, the system may intelligently locate other users ahead in the line that may be willing to retrieve a ticket for the requesting user, potentially based on the other users' accounts, profiles, and/or transaction histories, possibly indicating previous acceptances of such requests and/or similar requests.

In some embodiments, specific users ahead in the line may be selected based on the urgency of the requesting user to make a purchase. In some instances, the users may be selected in situations where there may be multiple users between the requesting user and the kiosk described in the scenarios above. Further, the requesting user may select a user ahead in the line based on various factors, including the limited number of items a single user may purchase per transaction, the number of items expected and/or estimated to be purchased by the user ahead in the line, and/or the number of items requested by the requesting user, among other possible factors. For example, consider another scenario where the kiosk allows each user to purchase a maximum of six items per transaction. Further, consider that a user ahead in the line may be expected to purchase four items and the requesting user may need four items as well. In such instances, the user ahead in the line expected to purchase four items may not be selected. Yet, in some instances, this user ahead in the line may be selected to purchase an additional two items for the requesting user, in conjunction with one or more other users ahead in the line that may be willing to purchase the remaining two items for the requesting user. Yet further, in some instances, the requesting user may wish a single user ahead in the line to purchase all the items requested by the requesting user, possibly where the requested tickets may be purchased with reserved seating, such that if multiple users ahead in the line fulfill the request, the seats may be separated in different areas. As such, in some instances, the system may identify a single user ahead in the line willing to accept the request to retrieve multiple tickets for the requesting user.

In some embodiments, the system may send the requesting user an image of the user ahead in the line that retrieves the ticket for the requesting user. Further, the system may send the retrieving user an image of the requesting user. As such, the retrieving user and the requesting user may identify each other, such that the retrieving user may physically pass along and/or transfer the ticket to the requesting user, possibly in exchange for a retrieval fee. In some instances, the system may determine the amount of the retrieval fee that the requesting user may be required to pay the retrieving user based on the retrieving user obtaining the ticket for the requesting user. As such, the requesting user's image may also be used to transfer the retrieving fee from the requesting user to the retrieving user. Yet further, the system may electronically transfer the retrieving fee from the requesting user's account to the retrieving user's account, among various other possibilities to transfer the retrieving fee, including third-party transfers. As such, the various exchanges described herein may be made physically and/or electronically based on a number of circumstances.

Notably, the retrieving user may obtain tickets for herself and the requesting user to seamlessly make a single transaction at the kiosk device, possibly based on a mobile application on the retrieving user's smartphone. In some instances, based on accepting the request for tickets from the requesting user, the retrieving user may be able to move her smartphone approximately four centimeters from the kiosk device to make a single transaction to obtain tickets for her and the requesting user, possibly utilizing near field communication (NFC) to make the transaction. As such, the system may be configured to aggregate multiple transactions into a single transaction, possibly numerous transactions into a single transaction.

Yet further, consider another scenario where multiple requesting users in the back of the line request tickets from the retrieving user described above. In such instances, the multiple requests may also be detected by the system, such that the system may aggregate, combine, and/or consolidate the requests into a single combined request that is sent to the retriever user's smartphone. In such instances, the retrieving user may make a single acceptance to retrieve a number of requested tickets from the multiple requesting users. In practice, the retrieving user may make the single acceptance, e.g., one touch input to the mobile application on her smartphone, and move her smartphone near the kiosk device to obtain the multiple tickets requested from the multiple requesting users using NFC, as described above. Alternatively, the retrieving user may select only one or more requests from the multiple requests, where the selected requests may be aggregated to make a single transaction as described above. As such, in practice, the retrieving user may obtain tickets for multiple requesting users waiting in a longer line, possibly obtaining retrieval fees from each requesting user in exchange for the tickets retrieved for each requester user. Thus, the retrieving user's account may accumulate numerous retrieval fees from the multiple requesting users. As such, the system may be configured to aggregate numerous transactions into a single transaction to improve efficiencies associated with the various waiting processes described, thereby making such processes more convenient for the users.

In some embodiments, the system may detect a requester user waiting in a line, possibly based on the GPS coordinates of the user's smartphone indicating incremental movements as the requesting user moves in the line. Further, the system may determine that the requesting user may want to make a purchase by requesting the other users ahead in the line to retrieve a ticket for the requesting user. In such instances, the system may determine which others users ahead in the line may be willing to retrieve the ticket for the requesting user, as well users that may be willing to satisfy any requirements specified by the requesting user, possibly involving a requirement as to a time by which the requested ticket must be retrieved, a quantity of the tickets requested, and/or the types of tickets requested, among other possibilities. Thus, based on the user's request for the ticket, the system may provide the requesting user with a list of the other users ahead in the line willing to retrieve the ticket and satisfy the one or more requirements, where the list may be displayed on the requesting user's smartphone, such that the smartphone may be enabled to send the request to one or more of the other users to retrieve and/or purchase the ticket for the requesting user.

FIG. 1A illustrates an exemplary system 100, according to an embodiment. As shown, a user 102 may be the requesting user described above, possibly where the user 102 may be in a hurry to get an item, such as a ticket item, from the kiosk device and/or system 108, possibly to get on the next train. In particular, there may be one or more users ahead in the line to the kiosk device 108. For example, as shown, the user 104 and the user 106 may be ahead of the user 102 in the line to the kiosk 108. Notably, the users 102, 104, and/or 106 are shown for purposes of examples and illustration. Thus, there may be multiple other users between the user 102 and the kiosk 108, as provided in the scenarios described above involving the longer waiting lines. It should also be noted that the kiosk device 108 may, in some instances, take the form of a boarding pass kiosk, a train ticket kiosk, a ticket counter, a check-out station, a check-out counter, a point-of-sale (POS) device, among other possible devices, such as an automated teller machine (ATM).

Further, it should be noted that the users 102, 104, and/or 106 may be in a line, such as single file line, such that the user 104 is in front of the user 102 and further the user 106 is in front of the user 104. In various circumstances, the line may move, possibly based on the users 102, 104, and/or 106 moving towards the kiosk device 108. Further, the line may change based on various factors, such as the movements of the users 102, 104, and/or 106, and/or possibly where the line may bend around objects. Yet further, the line may get longer based on other users joining the line or the line may get shorter based on the users 104 and/or 106 leaving the line.

Figure 1B:
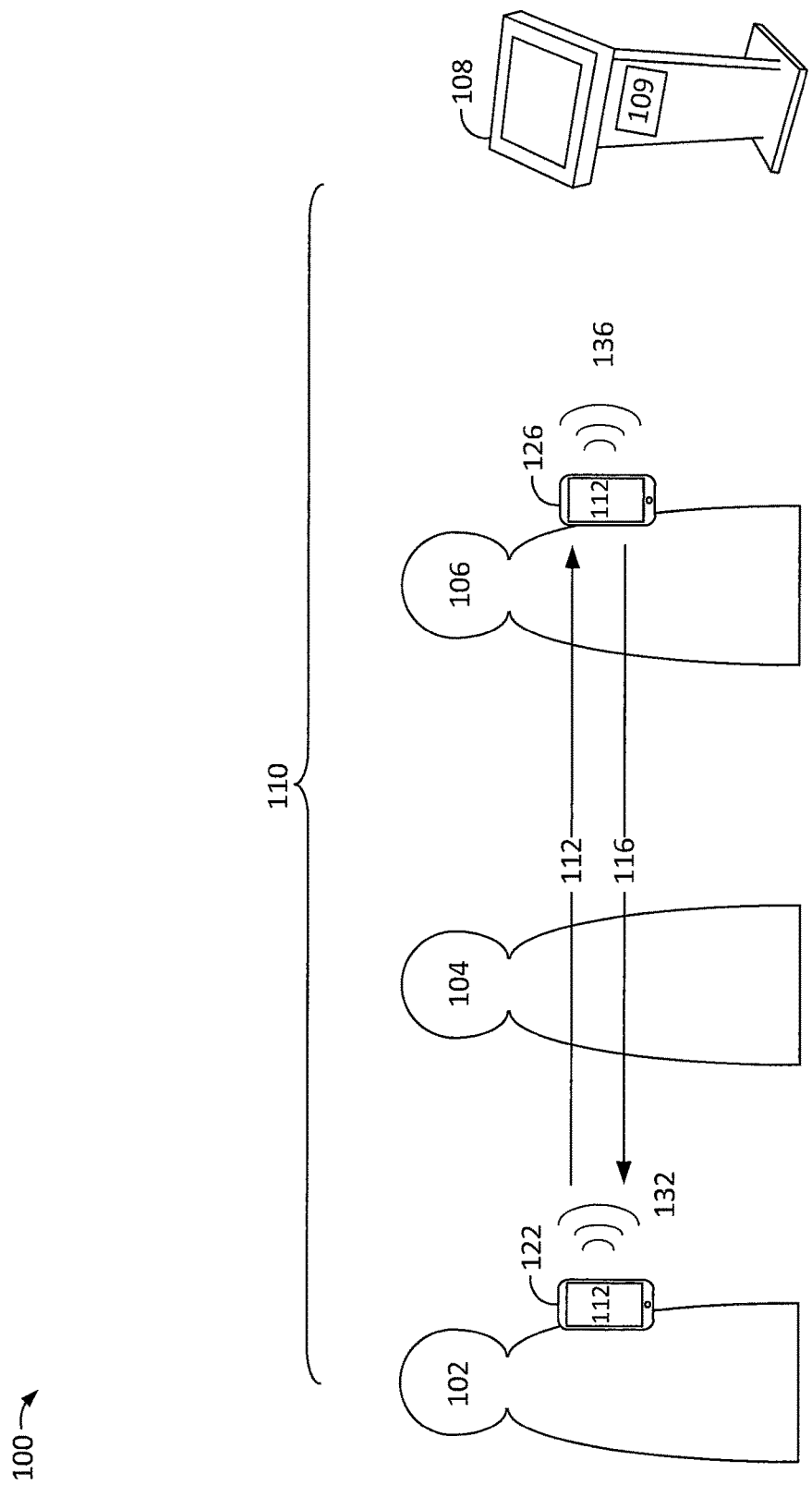
FIG. 1B illustrates an exemplary system with mobile devices, according to an embodiment.

FIG. 1B illustrates the exemplary system 100 with mobile devices 122 and/or 126, according to an embodiment. As shown, the system 100 may include the users 102, 104, and/or 106 described above, along with the kiosk device 108. Further, the user 102 may have the mobile device 122 and the user 106 may have the mobile device 126, possibly where the mobile devices 122 and/or 126 take the form of smartphones. Yet, the mobile devices 122 and/or 126 may also take the form of wearable computers, laptop computers, and/or tablet computers, among other types of computing devices configured to communicate electronically.

In some embodiments, the system 100 may detect a distance 110 between the mobile device 122 and the kiosk 108, possibly based on detecting the global positions system (GPS) coordinates of the mobile device 122, and possibly also based on the GPS coordinates of the kiosk device 108. As such, the system 100 may generate a request 112 for the user 102, possibly based on detecting the user 106 is ahead in the line, where the user 102 is a distance 110 from the kiosk 108. Further, the request 112 may be generated based on the system 100 determining and/or identifying the user 106 is willing to retrieve an extra ticket for the user 102. For example, the system 100 may determine the user 106 is willing to retrieve the ticket item 109 based on account information, profile information, and/or transaction histories associated with the user 106, possibly indicating previous acceptances of requests similar to the request 112. As such, the generated request 112 may be displayed by the mobile device 122, possibly so the user 102 may view, modify, and/or change the request 112. It should be noted that the request 112 may also be created by the user 102 with the mobile device 122, as described herein.

In some embodiments, the generated request 112 may be transmitted to the user 106. For example, the generated request 112 may be transmitted from the mobile device 122, also referred to as the requester device 122. In particular, the generated request 112 may be transmitted from the requester device 122 based on an input received by the requester device 122, such as a touch input received from the requesting user 102 on a button that indicates, "Send the Request 122," for example. As such, the transmitted request 112 may be sent to the mobile device 126, also referred to as the retriever device 126. In particular, the transmitted request 112 may be sent to the retriever device 126 based on the wireless signals 132, possibly including short-wavelength radio waves in the radio band of 2.4 to 2.485 GHz, such as Bluetooth®, for example. Yet, some instances, the transmitted request 112 may be sent to the system 100, possibly including one or more cloud networks and/or base station networks, and further transferred from the networks to the retriever device 126.

In some embodiments, the retriever device 126 may receive the request 112 transmitted from the requester device 122, possibly based on the wireless signals 132 described above. Yet, in some instances, the retriever device 126 may receive the request 112 transmitted from the one or more cloud networks of the system 100 described above. As such, the retriever device 126 may display the transmitted request 112. Thus, in response to the transmitted request 112, the retriever device 126 may transmit an acceptance message 116 that indicates the user 106 is willing to retrieve an extra item 109 from the kiosk device 108 for the user 102. In particular, the acceptance message 116 may be transmitted in response to an input received by the retriever device 126, possibly a touch input from the user 106 on a button that indicates, "Accept the Request 122," for example. In some instances, the acceptance message 116 may be transmitted to the requester device 122 to accept the request 112, possibly where the acceptance message 116 is transmitted based on the communication signals 136 that may follow the same or similar communication protocols as the wireless signals 132 described above. Yet, in some instances, the acceptance message 116 may be transmitted to the one or more cloud networks and/or base station networks described above such that the message 116 may be transferred and/or forwarded to the requester device 122 from the networks. It should be noted, in some instances, the generated request 112 may include a proposal to pay a retrieval fee in exchange for the user 106 retrieving the ticket item 109 for the user 102. As such, in some instances, the acceptance message 116 may indicate the user 106 is willing to retrieve the ticket item 109 from the kiosk device 108 in exchange for the retrieval fee.

Figure 1C:
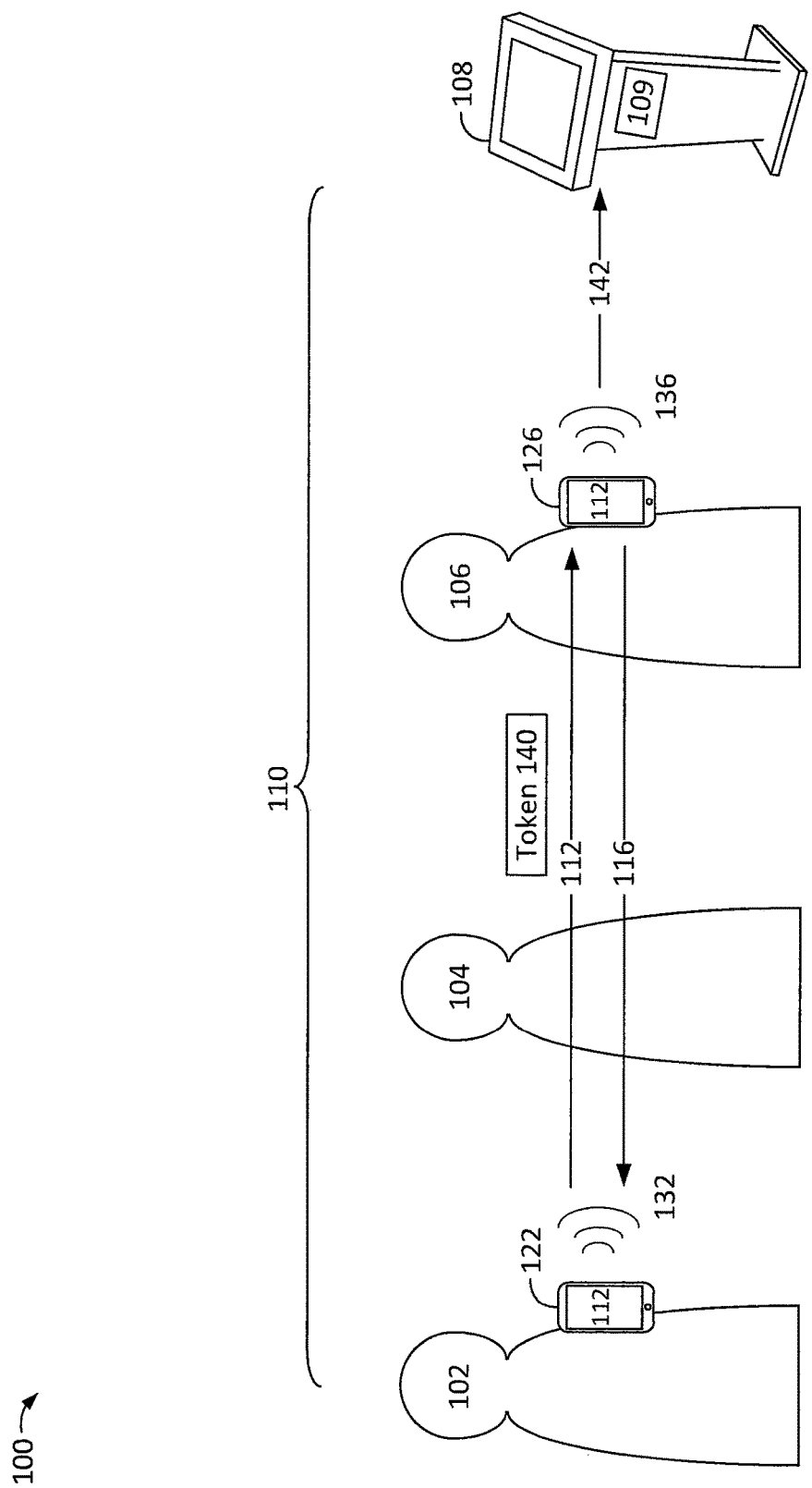
FIG. 1C illustrates an exemplary system with the one or more tokens, according to an embodiment.

FIG. 1C illustrates the exemplary system 100 with the one or more tokens 140, according to an embodiment. As shown, the system 100 may include the users 102, 104, and/or 106 described above, along with the kiosk device 108. Further, the user 102 may have the requester device 122 and the user 106 may have the retriever device 126, as described above.

In some embodiments, the system 100 and/or the requester device 122 may determine the request 112 for the one or more items 109 that is available from the kiosk device 108. For example, the system 100 and/or the requester device 122 may generate the request 112 based on the one or more distances 110 from the requester device 112 to the kiosk device 108. Further, the request 112 may be transmitted to the retriever device 126 to request the user 106 to retrieve the one or more items 109 from the kiosk device 108. In some instances, the request 112 may be transmitted to the retriever device 126 based on the wireless signals 132 described above. As noted, the request 112 may be transmitted to the retriever device 126 within the distance 110 from the requester device 122 to the kiosk device 108.

As noted above, in response to transmitting the request 112 to the retriever device 126, the system 100 and/or the requester device 122 may receive the acceptance message 116 from the retriever device 126 that indicates an acceptance by the user 106 to retrieve the one or more items 109 from the kiosk device 108 for the user 102. Yet, in response to the receiving the acceptance message 116, the system 100 and/or the requester device 122 may generate the token 140 for the retriever device 126 based on the determined request 112 for the one or more items 109. For example, the token 140 may be generated based on the number of tickets requested, the type of tickets requested, and/or the cost of the tickets requested, among other requested instructions in the request 112. As such, the generated token 140 may be transmitted to the retriever device 126 for the user 106 to retrieve the one or more items 109 from the kiosk device 108. In particular, the generated token 140 may be transmitted to the retriever device 126 based on the wireless signals 132, possibly including the 2.4 to 2.485 GHz radio waves.

In some embodiments, the retriever device 126 may transfer the token 140 with the request 142 to the kiosk device 108 for the ticket items 109 for the requesting user 102 and the retrieving user 106. Yet, in some instances, the retriever device 126 may be positioned approximately four centimeters from the kiosk device 108 to transfer the token 140 to the kiosk device 108 with the wireless signals 136, possibly including the near field communication (NFC) signals detected by the kiosk device 108. As such, the token 140 transferred to the kiosk device 108 may cause the kiosk device 108 to issue the ticket items 109 for the requesting user 102 and the retrieving user 106. Further, the token 140 may be an encrypted data packet transferred to the kiosk device 108 with the wireless signals 136 to cause the kiosk device 108 to issue the ticket items 109 for the requesting user 102 and the retrieving user 106. Yet, in some instances, the token 140 may displayed by the retriever device 126 in the form of quick response (QR) code that is scanned by the kiosk device 108 to issue the ticket items 109 for the user 102 and the user 106.

In some embodiments, referring to the retriever device 126, the retriever device 126 and/or the system 100 may generate a combined request 142 including the request 112 from the requester device 122, among other possible requests from devices contemplated herein. Further, the combined request 142 may also include a retriever request for one or more second ticket items from the ticket items 109 provided from the kiosk device 108, such that the requesting user 102 and the retrieving user 106 may have a respective ticket item from the ticket items 109 provided by the kiosk device 108. Further, the retriever device 126 may transmit the combined request 142 to the kiosk device 108 based on a near field communication (NFC) 136 with the kiosk device 108, among the other forms of communication exchanges with the kiosk device 108 described above.

Figure 1D:
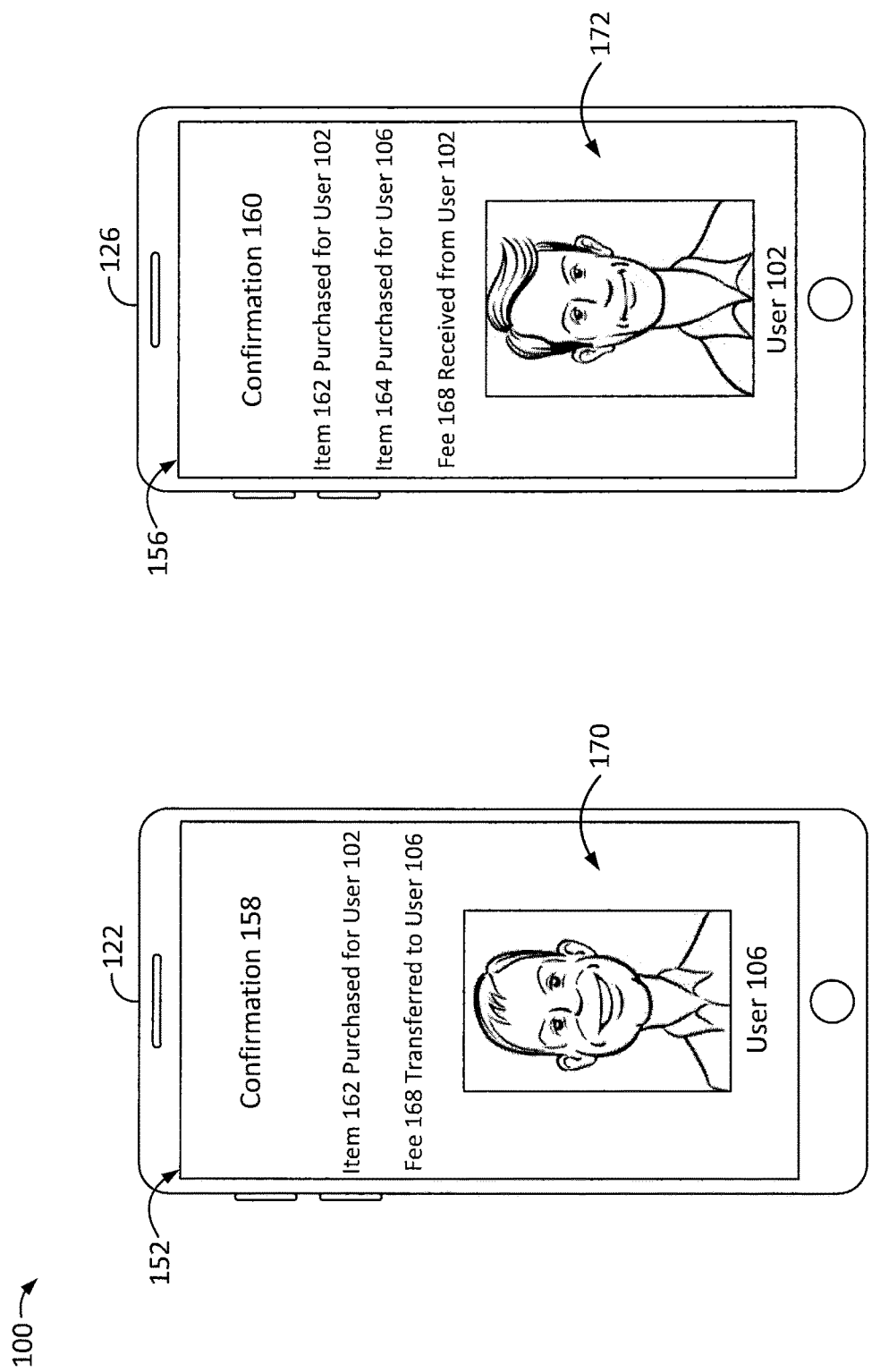
FIG. 1D illustrates an exemplary system with confirmations displayed by mobile devices, according to an embodiment.

FIG. 1D illustrates the exemplary system 100 with confirmations 158 and 160 displayed by the mobile devices 122 and 126, respectively, according to an embodiment. As shown, the requester device 122 may include a display 152 that provides the confirmation 158 that indicates the item 162 is purchased for the user 102, possibly where the item 162 corresponds to at least one item from the one or more items 109 described above. Further, the display 152 provides the fee 168 is transferred to the user 106, possibly in exchange for the user 106 retrieving the item 162 for the user 102. Yet further, the display 152 provides the image 170 of the user 106 such that the user 102 may be able to identify the user 106 with the item 162 retrieved from the kiosk device 108 for the user 102.

Further, as shown, the retriever device 126 may include a display 156 that provides the confirmation 160 that corresponds to the confirmation 158, as described above. In particular, the confirmation 160 may indicate the item 162 is purchased for the user 102, possibly where the item 162 corresponds to at least one item from the one or more items 109 described above. Further, the confirmation 160 may indicate the item 164 purchased for the user 106, possibly where the item 164 is at least one item from the one or more items 109 described above. Yet further, the display 156 provides the fee 168 received from the user 102 and/or the user 102's account, possibly in exchange for the user 106 retrieving the item 162 for the user 102. Yet further, the display 156 provides the image 172 of the user 102 such that the user 106 may be able to identify the user 102 to pass along the item 162 retrieved from the kiosk device 108 for the user 102. Notably, in some instance, the item 162 may have to be passed to the user 102 for the user 106 to retrieve the fee 168. In particular, based on the user 102 receiving the item 162, the user 102 may make an indication on the requester device 122 that the item 162 has been received such that the fee 168 may be transferred from the user 102's account to the user 106's account, possibly where the accounts are maintained by a payment provider.

In some embodiments, the system 100 and/or the requester device 122 may determine and/or identify the user 102's image 172 to authorize the user 106 to retrieve the item 162 from the kiosk device 108 for the retrieval fee 168 described above. In some instances, the retrieval fee 168 may be available from the user 102's account, possibly where the requester device 122 is logged into the user 102's account. In some instances, the request 122 transmitted to the retriever device 126 includes the user 102's image 172 to authorize the user 104 to retrieve the item 162 from the kiosk device 108 for the retrieval fee 168 from the user 102's account. As such, the requester device 122 may display a confirmation 158 associated with the retrieval of the item 162 from the kiosk device 108 for the retrieval fee 168. As noted, the confirmation 158 may include the retriever image 170, possibly where the retriever image 170 is associated and/or linked with the user 106's account.

In some embodiments, the system 100 and/or the requester device 122 may determine the global positioning system (GPS) coordinates of the requester device 122 associated with the determined request 112. As such, the system 100 and/or the requester device 122 may locate the retriever device 126 from one or more other devices between the GPS coordinates of the requester device 122 and the kiosk device 108. In some instances, the request 112 may be transmitted to the retriever device 126 based on locating the retriever device 126 from the one or more other devices between the GPS coordinates of the requester device 122 and the kiosk device 108.

In some embodiments, consider the scenarios above where the user 102 may be in a hurry to get the ticket item 162 from the kiosk device 108, possibly to catch the approaching train. In particular, consider the user 102 creating the request 112 with the requester device 122. In some instances, the system 100 and/or the requester device 122 may determine a time period indicated in the determined request 122 to retrieve the item 162 from the kiosk device 108. For example, the time period may indicate a short time period, such as three minutes, possibly where the train is approaching in three minutes. In some instances, the acceptance message 116 from the retriever device 126 may indicate the acceptance to retrieve the item 162 from the kiosk device 108 in the determined and/or specified time period.

In some embodiments, the system 100 and/or the requester device 122 may determine retrieval instructions in the request 112 to retrieve the item 162 from the kiosk device 108 for the retrieval fee 168. In some instances, the request 112 transmitted to the retriever device 126 may include detailed retrieval instructions to retrieve the item 162 from the kiosk device 108 for the retrieval fee 168. For example, the retrieval instructions may include instructions for physically transferring the item 162 to the user 102, possibly indicating a location proximate to the kiosk device 108 to transfer the item 162 to the user 102. Further, in some instances, the acceptance message 116 from the retriever device 126 may indicate an acceptance of the retrieval instructions to retrieve the item 162 from the kiosk device 108 for the retrieval fee 168, and also possibly transferring and/or passing the item 162 to the user in accordance with the retrieval instructions.

In some embodiments, the system 100 and/or the requester device 122 may determine an item type associated with the requested item 162. For example, the item type may indicate a type of the ticket item 162, such as a one-way and/or a round-trip ticket item 162, and/or possibly a destination associated with the item 162. Further, the item type may indicate the type of fare associated with the ticket item 162, an express type of the ticket item 162, a particular number assigned to the train associated with the ticket item 162, and/or an expiration associated with the ticket item 162, among other possibilities. In some embodiments, the system 100 and/or the requester device 122 may generate the token 140 for the retriever device 126 in the form of an authorization token 140 for the retriever device 126 based on the determined item type. As such, the authorization token 140 may provide an authorization to retrieve the item 162 from the kiosk device 108 for a retrieval fee 168 from the user 102's account, possibly accessed by the requester device 122. Notably, the authorization token 140 may include encoded data that indicates the authorization from the user 102 such that the user 106 may retrieve the item 162 from the kiosk 108 in exchange for the fee 168. In some instances, the authorization token 140 may provide a signature authorization from the user 102 recognized by the kiosk device 108 such that the user 106 may retrieve the item 162 for the user 102 for the fee 168.

In some embodiments, referring back to the retriever device 126, the device 126 may receive the request 112 for the one or more items 162 from one or more requester devices, such as the requester device 122 described above. In some instances, the retriever device 126 may receive the request 112 based at least on a distance from the retriever device 106 to the kiosk device 108, where the distance may be a segment of the distance 110 described above. The retriever device 126 may also determine an acceptance to retrieve the one or more items 162 from the kiosk device 108 for one or more retrieval fees 168 based on a user input from the user 106 received by the retriever device 126. For example, the acceptance may be determined based on user 106's touch input received by the retriever device 126. As such, the retriever device 126 may generate and/or transmit the acceptance message 116 to the one or more requester devices, such as the requester device 122 described above. In particular, the acceptance message 116 may be generated and/or transmitted based on the user 106's input received by the retriever device 126 that indicates the acceptance that the user 106 is retrieving the one or more items 162 from the kiosk device 108 for the one or more retrieval fees 168.

As shown in FIG. 1D, the retriever device 126 may display the confirmation 160 based on the user 106 retrieving the one or more items 162 from the kiosk device 108 for the user 102. In some instances, the user 106 may indicate the retrieval of the one or more items 162 through the retrieval device 126. Yet, in some instances, the kiosk device 106 may detect the retrieval of the one or more items 162 from the kiosk device 106, such that the kiosk device 106 communicates with the requester device 122 and/or the retriever device 126 and transmits the confirmations 158 and/or 160, respectively, to the requester device 122 and/or the retriever device 126. As noted, for example, the confirmation 160 may include one or more requester images 172 that corresponds to the one or more requester devices, such as the requester device 122 of the user 102. Notably, the confirmation 160 may include other images that correspond to additional requests received from other requesting users. As such, the user 106 may identify the user 102 and possibly other users that requested the items 162 and 109. Notably, the retriever device 126 may include a non-transitory machine-readable medium including instructions. Further, the instructions may be executable to cause the retriever device 126 to perform the various operations described herein.

Figure 2A:
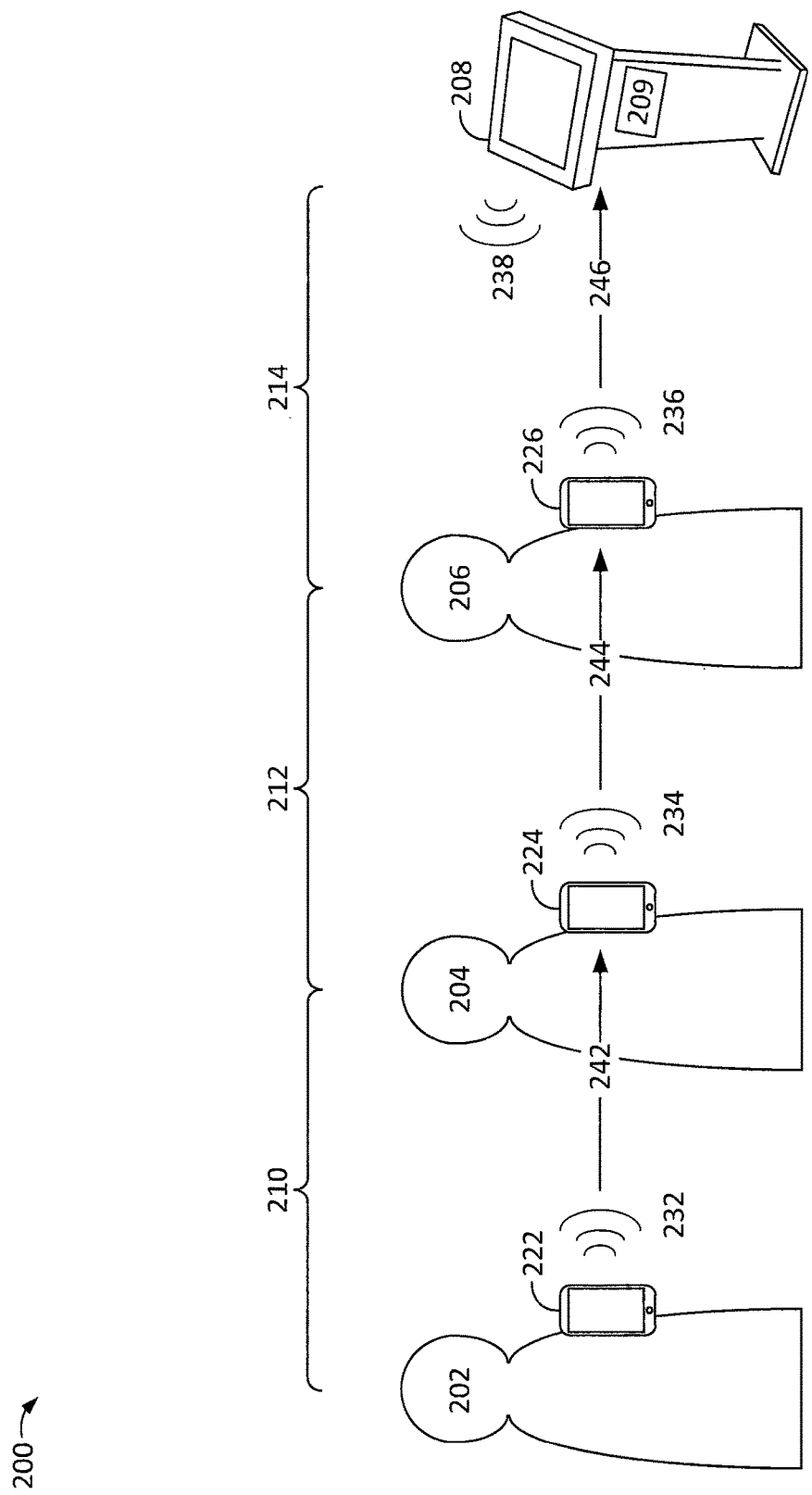
FIG. 2A illustrates an exemplary system with mobile devices, according to an embodiment.

FIG. 2A illustrates the exemplary system 200 with mobile devices 222, 224, and/or 226, according to an embodiment. The users 202, 204, and 206 may correspond to the users 102, 104, and 106, respectively. Further, the mobile devices 222 and 226 may correspond to the mobile device 122 and 126, respectively. Yet further, the user 104 may have the mobile device 224, possibly where the mobile device 224 takes the form of a smartphone, possibly similar to the form of the devices 222 and/or 226 described above, perhaps taking the form of wearable computers, laptop computers, and/or tablet computers, among other types of computing devices configured to communicate electronically. The kiosk device 208 may correspond to the kiosk device 108 and further, may take the form of an airline and/or a train ticket kiosk, a ticket counter, a check-out station, a check-out counter, a point-of-sale (POS) device, an automated teller machine (ATM) among other possible devices described above.

In some embodiments, the system 200 and/or the devices 222, 224, and/or 226 may detect a number of distances 210, 212, and/or 214. For example, the distance 210 may be detected between the mobile device 222 and the mobile device 224. Further, the distance 212 may be detected between the mobile device 224 and the mobile device 226. Yet further, the distance 214 may be detected between the mobile device 226 and the kiosk device 208. For example, the requester device 222 may detect the distances 210, 212, and/or 214 based on the wireless signals 232, possibly to transmit a request 242 to the devices 224 and/or 226. Further, the mobile device 224 may detect the distances 210, 212, and/or 214 based on the wireless signals 234, possibly to receive the request 242 from the requester device 222 and/or transmit the request 244 to the retriever device 226. Yet further, the retriever device 226 may detect the distance 214 based on the wireless signals 236, possibly to receive the request 244 and/or transmit a combined request 246 to the kiosk device 208, possibly where the combined request 246 includes, aggregates, and/or represents the requests 242 and/or 244. Further, the kiosk device 208 may receive the combined request 246 based on the wireless signals 238 of the kiosk device 208.

Notably, the wireless signals 232, 234, and/or 236 may include the short-wavelength radio waves in the radio band of 2.4 to 2.485 GHz, such as Bluetooth®, for example. In some embodiments, the system 200 may determine the distances 210-214 based on a triangulation of the respective global positions system (GPS) coordinates of the devices 222, 224, and/or 226, among other possibilities to transmit the requests 242, 244, and/or 246 over one or more cloud networks.

In some embodiments, the system 200 may generate and/or display the requests 242, 244, and/or 246 on the devices 222, 224, and/or 226 for the users 202, 204, and/or 206, respectively, possibly based on the distances 210, 212, and/or 214 detected. For example, the request 242 displayed by the requester device 222 may indicate the users 204 and/or 206 are within the distances 212 and/or 214 from the kiosk device 108. Further, the request 242 may be generated based on the system 200 determining the users 204 and/or 206 may be willing to retrieve an extra ticket item 209 for the user 202, possibly based on account information, profile information, and/or transaction histories associated with the users 204 and/or 206, possibly indicating previous acceptances of requests similar to the request 242. As such, the generated request 242 may be displayed by the mobile device 222, possibly so the user 202 may view, modify, and/or change the request 242. Yet, the request 242 may also be created by the user 202 with the mobile device 222.

In some embodiments, the system 200 and/or the device 224 may generate the request 244 based on the request 242 received, possibly incorporating the request 242 for a first ticket into the request 244 for a second ticket, where the first ticket is for user 202 and the second ticket is for the user 204. Further, the system 200 and/or the device 226 may generate the request 246 based on the request 244 received, possibly incorporating the request 242 for the first ticket and the request 244 for the second ticket into the request 244 for a third ticket for the user 206. Thus, the combined request 246 may for the first ticket, the second ticket, and the third ticket. Notably, the generated requests 242, 244, and/or 246 may be transmitted from the devices 222, 224, and/or 226, respectively, possibly based on respective inputs received by the devices 222, 224, and/or 226, such as touch inputs received from the respective users 202, 204, and/or 206, as described above.

Figure 2B:
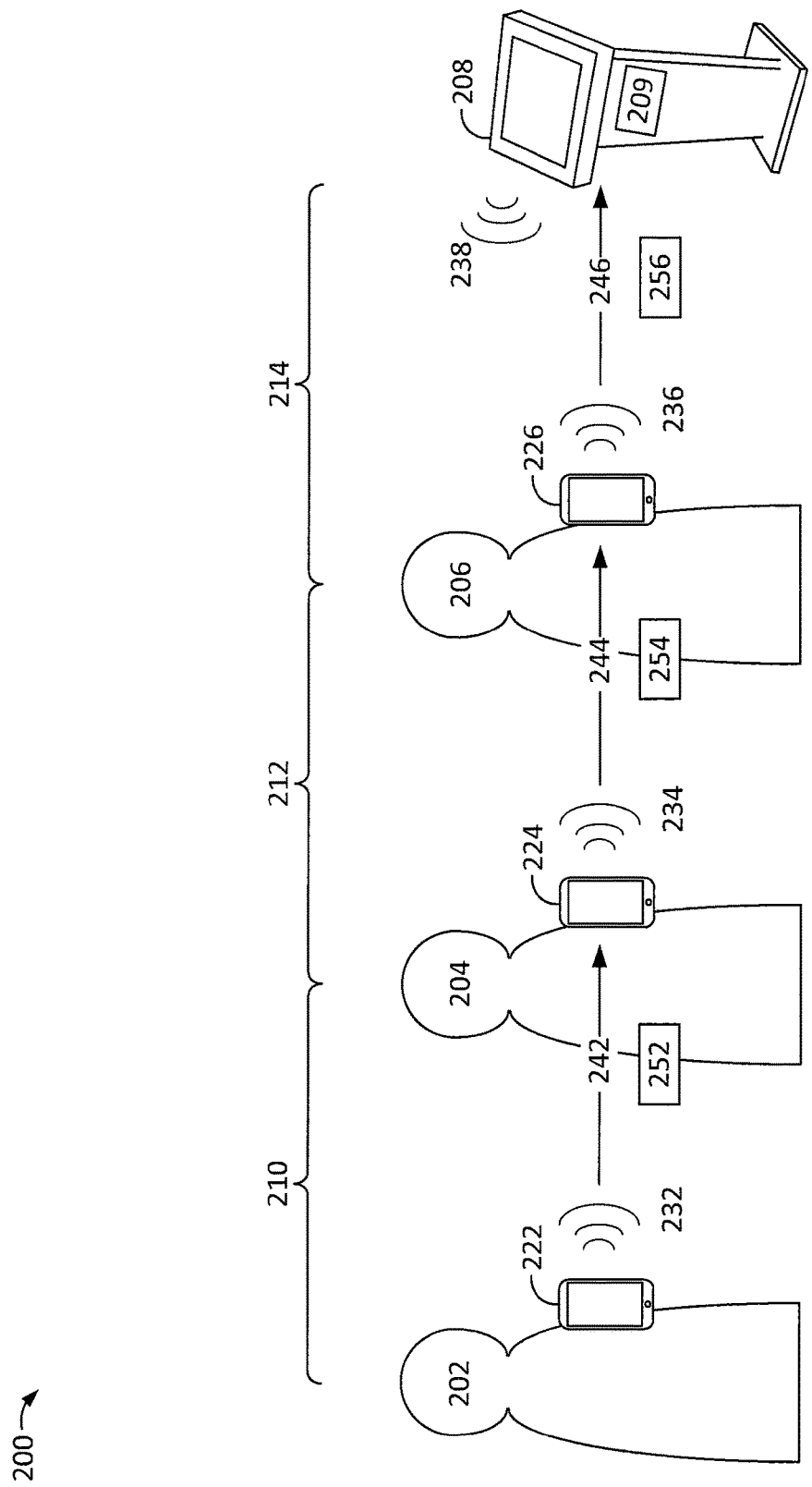
FIG. 2B illustrates an exemplary system with the one or more tokens, according to an embodiment.

FIG. 2B illustrates the exemplary system 200 with the one or more tokens 252, 254, and 256, according to an embodiment. As shown, the system 200 may include the users 202, 204, and/or 206 described above, along with the kiosk device 208. Further, the user 202 may have the requester device 222, the user 204 may have the mobile device 224, and the user 206 may have the retriever device 226, as described above.

In some embodiments, the system 200 may generate the tokens 252, 254, and/or 256. Further, in some instances, the devices 222, 224, and/or 226 may generate the tokens 252, 254, and/or 256, respectively. For example, the system 200 and/or the requester device 222 may generate the token 252, possibly encoded in the request 242. Further, the system 200 and/or the requester device 224 may generate the token 254, possibly encoded in the request 244. Yet further, the system 200 and/or the requester device 226 may generate the token 256, possibly encoded in the request 246. Notably, the tokens 252, 254, and/or 256 may be generated based on the number of tickets requested, the type of tickets requested, and/or the cost of the tickets requested, among other requested instructions in the requests 242, 244, and/or 246, as contemplated above. Further, the generated tokens 252, 254, and/or 256 may be transmitted to issue and/or retrieve the one or more items 209 from the kiosk device 208 for the users 202, 204, and/or 206. In particular, the generated tokens 252, 254, and/or 256 may be transmitted to the devices 224, 226, and/or 208, respectively, based on the wireless signals 232, 234, and/or 236, possibly including the 2.4 to 2.485 GHz radio waves described above.

In some embodiments, the device 222 may positioned approximately four centimeters from the device 224 to transfer the token 252 to the device 224, the device 224 may positioned approximately four centimeters from the device 226 to transfer the token 254 to the device 226, and the device 226 may positioned approximately four centimeters from the kiosk device 208 to transfer the token 256 to the kiosk device 208. Further, the token 256 may be transferred to the kiosk device 208 based on the wireless signals 236 and/or the near field communication (NFC) signals 238 of the kiosk device 208. As such, the token 256 transferred to the kiosk device 208 may cause the kiosk device 208 to issue ticket items 209 for the user 202, the user 204, and the user 206, among other possible users. As noted above, the token 256 may also be displayed by the device 226 in the form of a QR code, such that the kiosk device 208 may scan the QR code to issue the ticket items 209 for the user 202, the user 204, and the user 206, among other possible users.

In some embodiments, the system 200 and/or the requester device 224 may determine a first token 252 from the request 242 for a first item from the one or more items 209, possibly where the first token 252 is encoded in the request 242. Further, the system 200 and/or the requester device 224 may generate a second token 254 for the request 244, possibly also referred to as an acceptance message 244 in some instances. Thus, the second token 254 may be generated based on the determined first token 252, possibly where the second token 254 is generated with the first token 252 encoded in the second token 254. Yet further, the second token 254 may be configured to initiate a transaction for the first item and a second item of the items 209, where the first item may be a first ticket item for the first user 202 and the second item may be a second ticket item for the user 204. As such, the acceptance message 244 may include the second token 254 and may be transmitted to the kiosk device 208 to authorize the transaction for the first item and the second item, possibly after the user 206 has stepped away from the kiosk device 208 in this scenario.

Figure 2C:
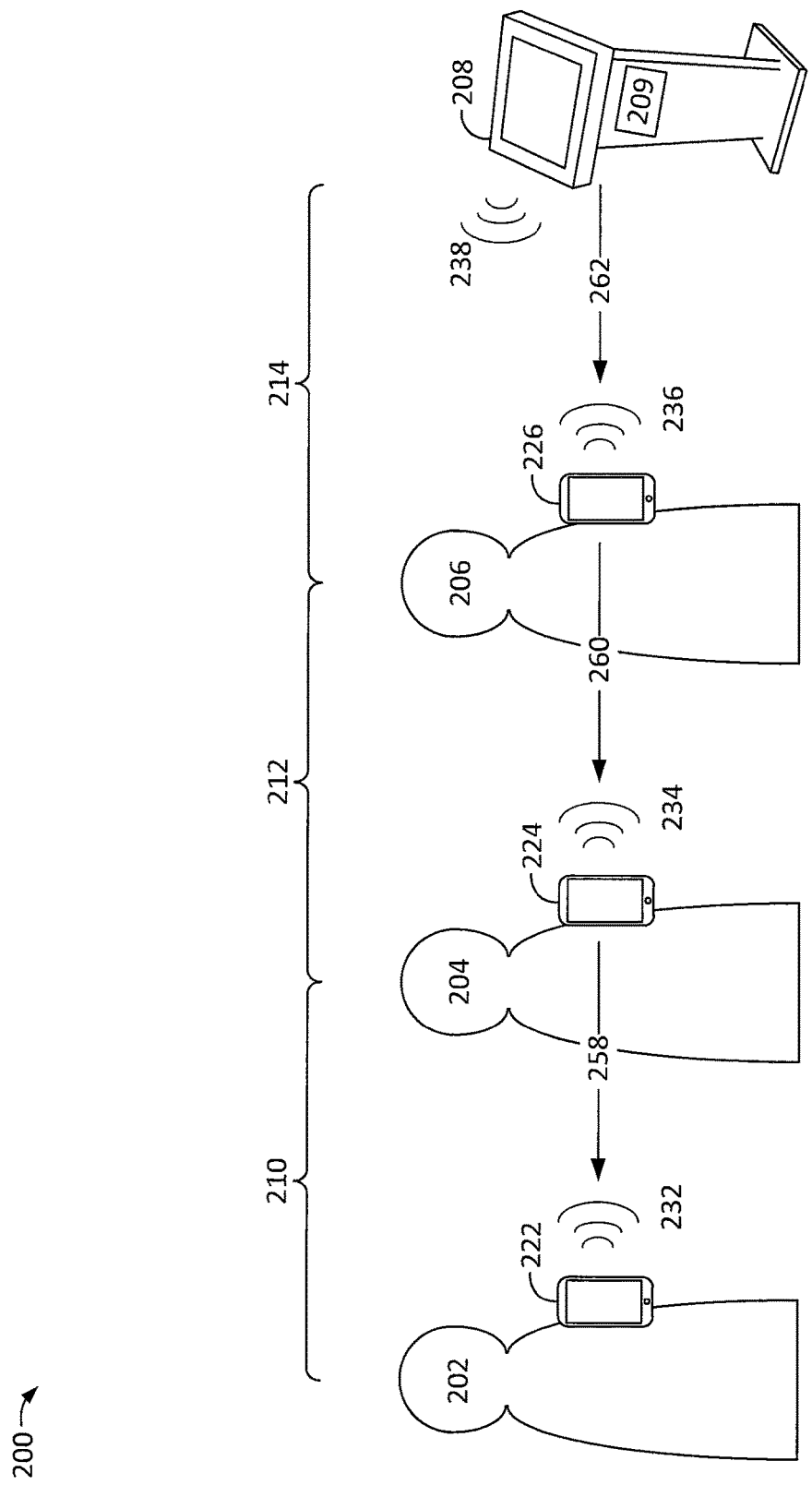
FIG. 2C illustrates an exemplary system with the one or more confirmations, according to an embodiment.

FIG. 2C illustrates the exemplary system 200 with the one or more confirmations 258, 260, and/or 262, according to an embodiment. As shown, the system 200 may include the users 202, 204, and/or 206 described above, the corresponding distances 210, 212, and/or 214, and the kiosk device 208. Further, the user 202 may have the requester device 222, the user 204 may have the requester device 224, and the user 206 may have the retriever device 226, as described above.

In some embodiments, one or more of the confirmations 258, 260, and/or 262 may be transmitted. In some instances, the confirmation 258 may take the form of the confirmation 158, possibly including an indication such as the item 162 purchased for the user 202, the fee 168 transferred to the user 206, and the image 170 of the user 206. Further, the confirmation 262 may take the form of the confirmation 160, possibly including an indication such as the item 162 purchased for the user 202, the item 164 purchased for the user 206, the fee 168 transferred from the user 202 to the user 206, and the image 172 of the user 202. Yet further, the confirmation 262 may indicate at least one item purchased for the user 204, a corresponding fee transferred from the user 204's account to the user 206's account, and also an image of the user 204.

In some embodiments, the mobile device 224 may perform requester device operations and/or retriever device operations, thereby possibly being referred to as the requester device 224 and/or the retriever device 224. As noted, for example, the device 224 may receive the request 242 transmitted from the requester device 222, possibly based on the wireless signals 232 described above. Yet, in some instances, the retriever device 224 may receive the request 242 transmitted from the one or more cloud networks of the system 200 described above. As such, the retriever device 224 may display the transmitted request 242. Thus, in response to the transmitted request 242, the retriever device 224 may transmit the confirmation 258, possibly including the acceptance message 116 described above, indicating the user 204 is willing to retrieve an extra item for the user 202 from the one or more items 209 from the kiosk device 208. In particular, the confirmation 258 may be transmitted in response to an input received by the device 224, possibly a touch input from the user 204.

In some embodiments, referring to retriever device 226, the retriever device 226 and/or the system 200 may receive the confirmation 262 from the kiosk device 208 based on the kiosk device 208 issuing the one or more items 209 and/or the user 206 retrieving the one or more items 209 from the kiosk device 208. Further, the retriever device 226 and/or the system 200 may transmit the confirmation 260 to the proximate requester device 224 of the one or more requester devices 222 and/or 224, possibly based on the requester device 224 being closer to the retriever device 226. Further, the transmittal of the confirmation 260 to the proximate requester device 224 may cause a subsequent transmittal of the confirmation 258 from the proximate requester device 224 to a second proximate requester device 222, possibly where the subsequent transmittals are described as trigger transmittals and/or domino transmittals.

In some embodiments, referring back to FIG. 2B, the system 200 and/or the device 224 may generate a combined request 244 including the request 242 from the requester device 222. The combined request 244 may be for a first item for the user 202 and a second item for the user 204 from the one or more items 209. The combined request 244 may be transmitted to the retriever device 226. Further, the user 206 may accept the combined request 244, possibly where an acceptance message, taking the form of the acceptance message 116 described above, is transmitted based on the communication signals 236 to the requester devices 222 and/or 224. Yet, in some instances, the acceptance message 116 may be transmitted to the one or more cloud networks described above such that the message 116 may be transferred to the requester devices 222 and/or 224 from the cloud networks. It should be noted, in some instances, the combined request 244 may include respective proposals from the users 202 and 204 to pay respective retrieval fees in exchange for the user 206 retrieving the first item and the second item of the items 209 for the users 202 and 204. As such, in some instances, the acceptance message 116 may indicate the user 206 is willing to retrieve the first and second items of the items 209 from the kiosk device 208 in exchange for the retrieval fees.

In some embodiments, referring to the retriever device 226, the request 244 received from the mobile device 224 may indicate the first request 242 for a first item of the items 209 and the second request 244 for a second item of the items 209. As such, the system 200 and/or the retriever device 226 may determine a first acceptance 258 and a second acceptance 260 to retrieve the first item and the second item of the items 209 from the kiosk device 208. For example, the first item may be retrieved by the user 206 for a first retrieval fee from the first user 202 and the second item may be retrieved by the user 206 for a second retrieval fee from the second user 204. For example, the retriever device 226 may determine the first and second acceptances 258 and/or 260, respectively, based on the user 206's input to the retriever device 226. Notably, the acceptance message, possibly taking the form of the acceptance message 116 described above, may be transmitted to the second requester device 224 based on the second acceptance 260 to retrieve the second item of the items 209 from the kiosk device 208 for the second retrieval fee. In some instances, the confirmation displayed by the retriever device 226, possibly taking the form of the confirmation 160, may indicate the retrieval of the second item from the kiosk device 208. As described in the scenarios above, the confirmation 160 displayed may include the one or more requester images, such as the image 172, possibly displaying a second requester image of the user 204 associated with the second requester device 224.

Figure 3:
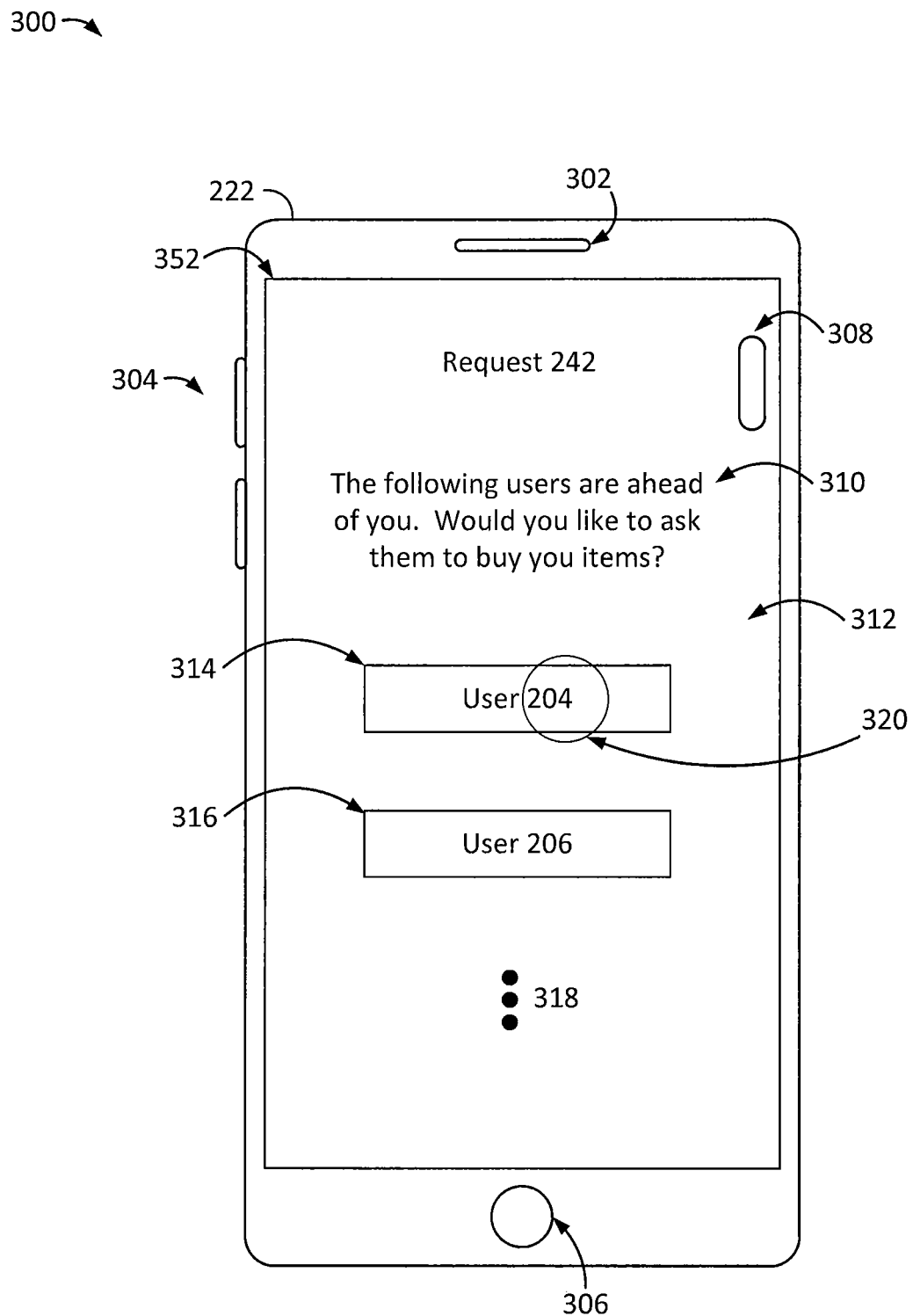
FIG. 3 illustrates an exemplary system with a mobile device, according to an embodiment.

FIG. 3 illustrates an exemplary system 300 with the mobile device 222, according to an embodiment. The system 300 may include aspects of the systems 100 and/or 200 described above in relation to FIGS. 1A-2C. The mobile device 222 shown in FIG. 3 may be the mobile device 222 described above in relation to the FIGS. 2A-2C. As shown, the mobile device 222 includes a speaker 302, buttons 304, a button 306 with a fingerprint sensor configured to detect a fingerprint from the user 202, a scroll button 308 that may move vertically along the input/output (I/O) interface 352, among other components and/or features.

Further, as shown, the mobile device 222 may include the I/O interface 352, possibly referred to as a display 352, that renders and/or displays the notification 310. The notification 310 may indicate and/or identify the users ahead of the mobile device 222 in the one or more lines described above, possibly including waiting areas and/or waiting rooms, among various other possibilities. In this example, the notification 310 provides, "The following users are ahead of you. Would you like to ask them to buy you items?" Further, the I/O interface 352 displays a list 312 of various users including the user 204 provided with the button 314, the user 206 provided with the button 316, among other users contemplated with the ellipses 318, possibly based on longer lines as described above. As such, considering the scenarios above, the user 202 may make a selection 320 of the button 314 to select the user 204. As such, the request 242 may be transmitted to the mobile device 224, as described above. Notably, the list 312 is shown for purposes of illustration such that the user 206 with the button 316 may be displayed above the user 204 with the button 314.

Figure 4:
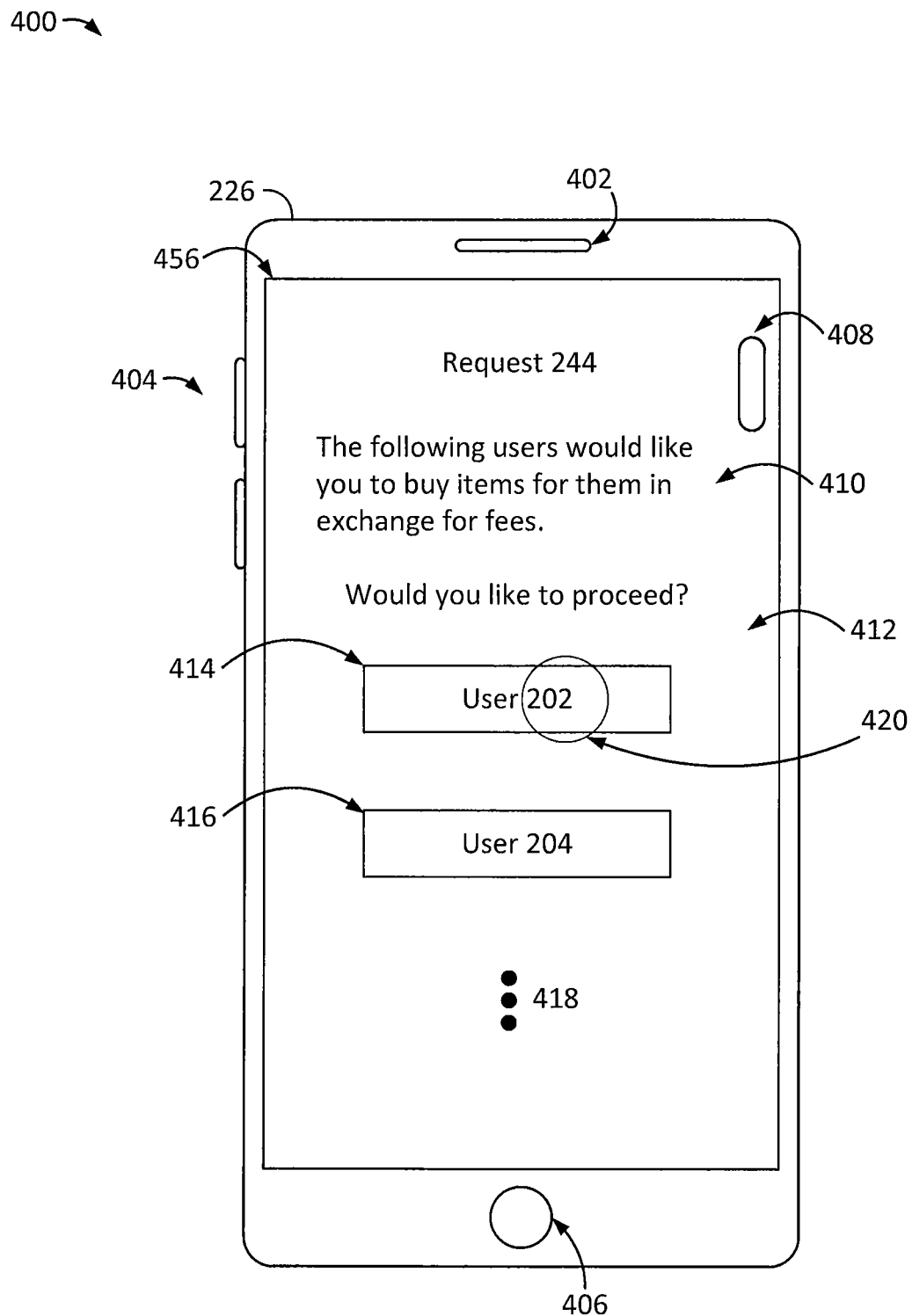
FIG. 4 illustrates an exemplary system with another mobile device, according to an embodiment.

FIG. 4 illustrates an exemplary system 400 with the mobile device 226, according to an embodiment. The system 400 may include aspects of the systems 100, 200, and/or 300 described above in relation to FIGS. 1A-3. The mobile device 226 shown in FIG. 4 may be the mobile device 226 described above in relation to the FIGS. 2A-3. As shown, the mobile device 226 includes a speaker 402, buttons 404, a button 406 with a fingerprint sensor configured to detect a fingerprint from the user 206, a scroll button 408 that may move vertically along input/output (I/O) interface 456, among other components and/or features.

Further, as shown, the mobile device 226 may include the I/O interface 456, possibly referred to as a display 456, that renders and/or displays the notification 410. The notification 410 may indicate and/or identify the users behind the mobile device 226 in the one or more lines described above, possibly including waiting areas and/or waiting rooms, among various other possibilities. In this example, the notification 410 provides, "The following users would like you to buy items for them in exchange for fees. Would you like to proceed?" Further, the I/O interface 456 displays a list 412 of various users including the user 202 provided with the button 414, the user 204 provided with the button 416, among other users contemplated with the ellipses 418, possibly based on longer lines as described above. As such, considering the scenarios above, the user 204 may make a selection 420 of the button 414 to select the user 202, possibly accepting the request the 242 described above. As such, the acceptance and/or confirmation 258 may be transmitted to the mobile device 222, as described above.

Figure 5:
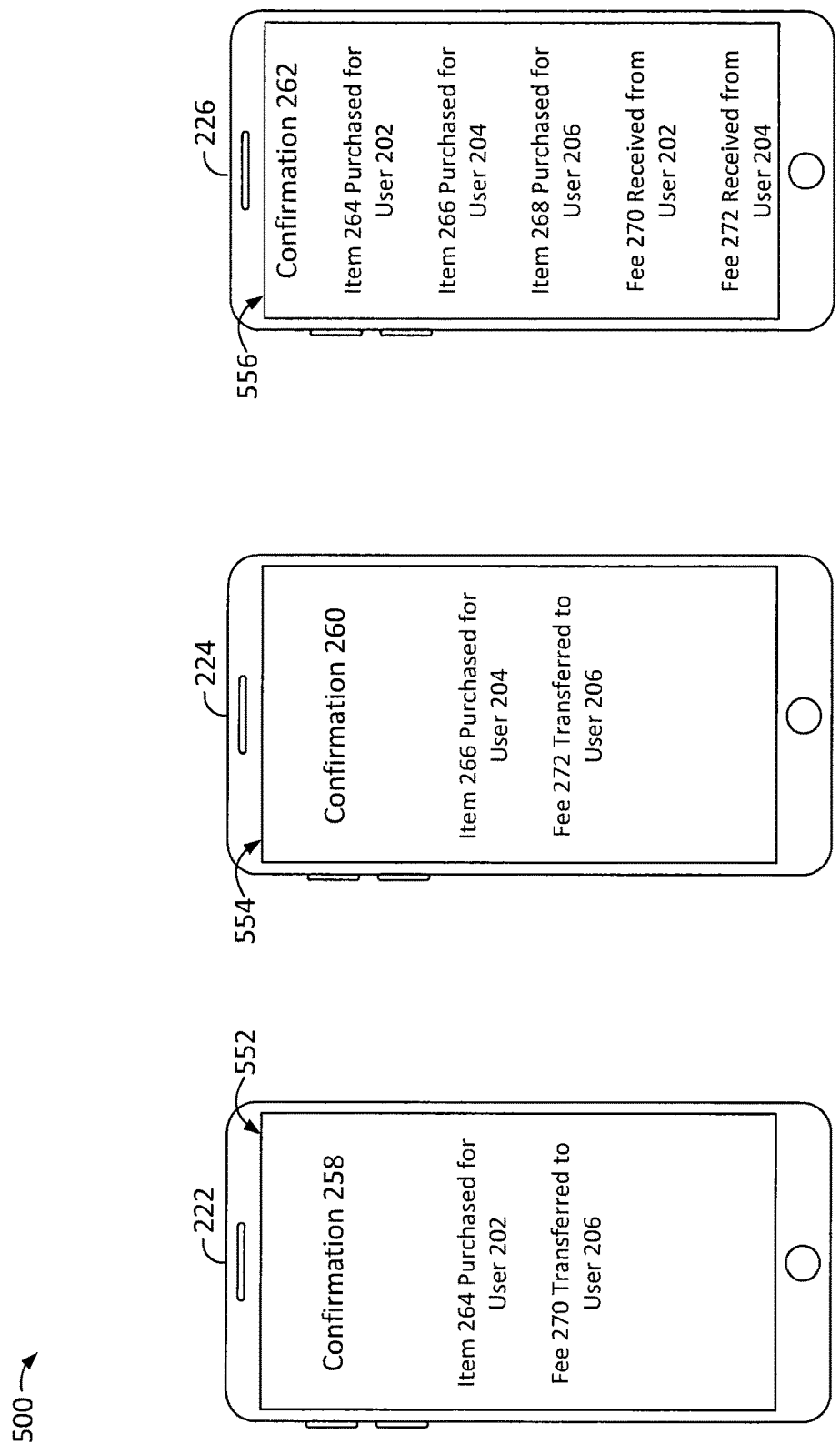
FIG. 5 illustrates an exemplary system with multiple mobile devices, according to an embodiment.

FIG. 5 illustrates an exemplary system with multiple mobile devices 222, 224, and/or 226, according to an embodiment. The system 500 may include aspects of the systems 100, 200, 300, and/or 400 described above in relation to FIGS. 1A-4. The mobile devices 222, 224, and/or 226 shown in FIG. 5 may be the mobile devices 222, 224, and/or 226 described above in relation to the FIGS. 2A-4. As shown, the mobile device 222 may include the input/output (I/O) interface 552 that may take the form of the I/O interface 352. The mobile device 224 may include the I/O interface 554 may also take similar form the I/O interfaces 352 and/or 456 described above. The mobile device 226 may include I/O interface 556 that may take the form of the I/O interface 456.

As shown, the requester device 222 may display the confirmation 258 on the I/O interface 552. The confirmation 258 may provide "Item 264 Purchased for User 202" and "Fee 270 Transferred to User 206," possibly indicating the fee 270 being transferred to the user 206's account for retrieving the item 264 from the kiosk device 208 for the user 202. The confirmation 260 may provide "Item 266 Purchased for User 204" and "Fee 272 Transferred to User 206," possibly indicating the fee 272 being transferred to the user 206's account for retrieving the item 266 from the kiosk device 208 for the user 204. The confirmation 262 may provide "Item 264 Purchased for User 202," "Item 266 Purchased for User 204," "Item 268 Purchased for User 206," "Fee 270 Received from User 202," "Fee 272 Received from User 204," possibly indicating the fees 270 and 272 being transferred to the user 206's account for retrieving the items 264 and 266 from the kiosk device 208 for the users 202 and 204, respectively.

Figure 6:
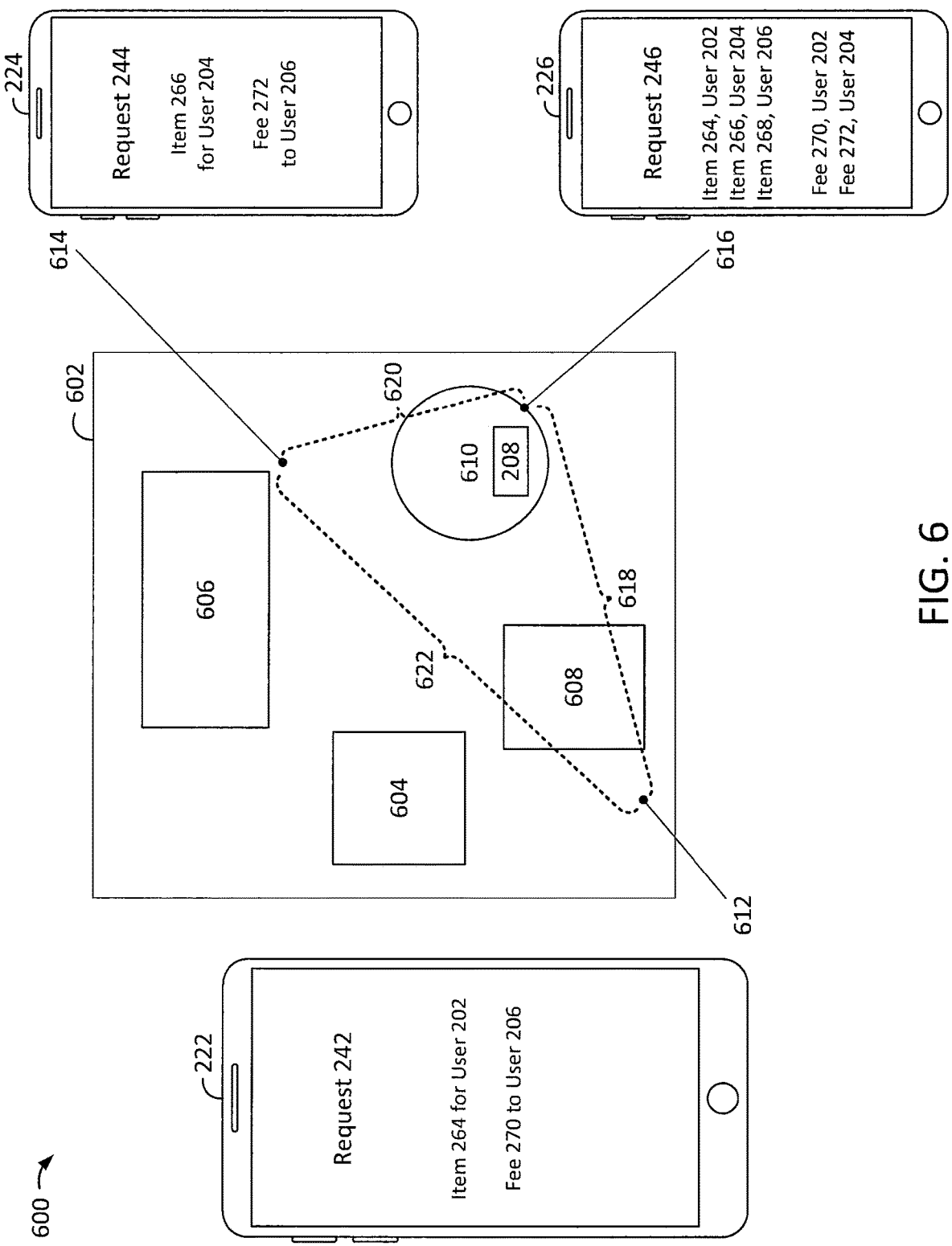
FIG. 6 illustrates an exemplary system with multiple mobile devices, according to an embodiment.

FIG. 6 illustrates an exemplary system 600 with multiple mobile devices 222, 224, and 226, according to an embodiment. The system 600 may include aspects of the systems 100, 200, 300, 400, and/or 500 described above in relation to FIGS. 1A-5. As shown, the mobile devices 222, 224, and/or 226 in FIG. 6 may be the mobile devices 222, 224, and/or 226, respectively, described above in relation to the FIGS. 2A-5.

As shown on the map 602 with the buildings 604, 606, 608, and/or 610, the mobile device 222 may be at a location 612, the mobile device 224 may be at a location 614, and the mobile device 226 may be at a location 616 proximate to the kiosk device 208 in the building 610. In some instances, the mobile device 222 may determine a distance 618 from the location 612 of the mobile device 222 to the kiosk device 208 and/or the location 616 of the mobile device 226. Further, the mobile device 222 may determine a distance 620 from the mobile device 224 to the kiosk device 208 and/or the location 616 of the mobile device 226. As such, the mobile device 222 may generate the request 242 for the item 264 for the user 202 based on the distances 618 and/or 620. In some instances, the mobile device 222 may transmit the request 242 to the mobile device 224 based on the distance 618 of the mobile device 222 to the kiosk device 208 being greater than the distance 620 from the mobile device 224 to the kiosk device 208. Yet, the mobile device 222 may transmit the request 242 to the mobile device 226 based on the location 616 of the mobile device 226 being proximate to the kiosk device 208, among other possibilities.

In some embodiments, the mobile device 224 may determine the distance 618 from the location 612 of the mobile device 222 to the kiosk device 208 and/or the location 616 of the mobile device 226. Further, the mobile device 224 may determine the distance 620 from the mobile device 224 to the kiosk device 208 and/or the location 616 of the mobile device 226. As such, the mobile device 224 may generate the request 244 for the item 266 for the user 204 based on the distances 618 and/or 620. For example, the mobile device 224 may transmit the request 244 to the mobile device 226 based on the distance 618 of the mobile device 222 to the kiosk device 208 being greater than the distance 214 described above in FIGS. 2A-2C from the mobile device 226 to the kiosk device 208.

Figure 7:
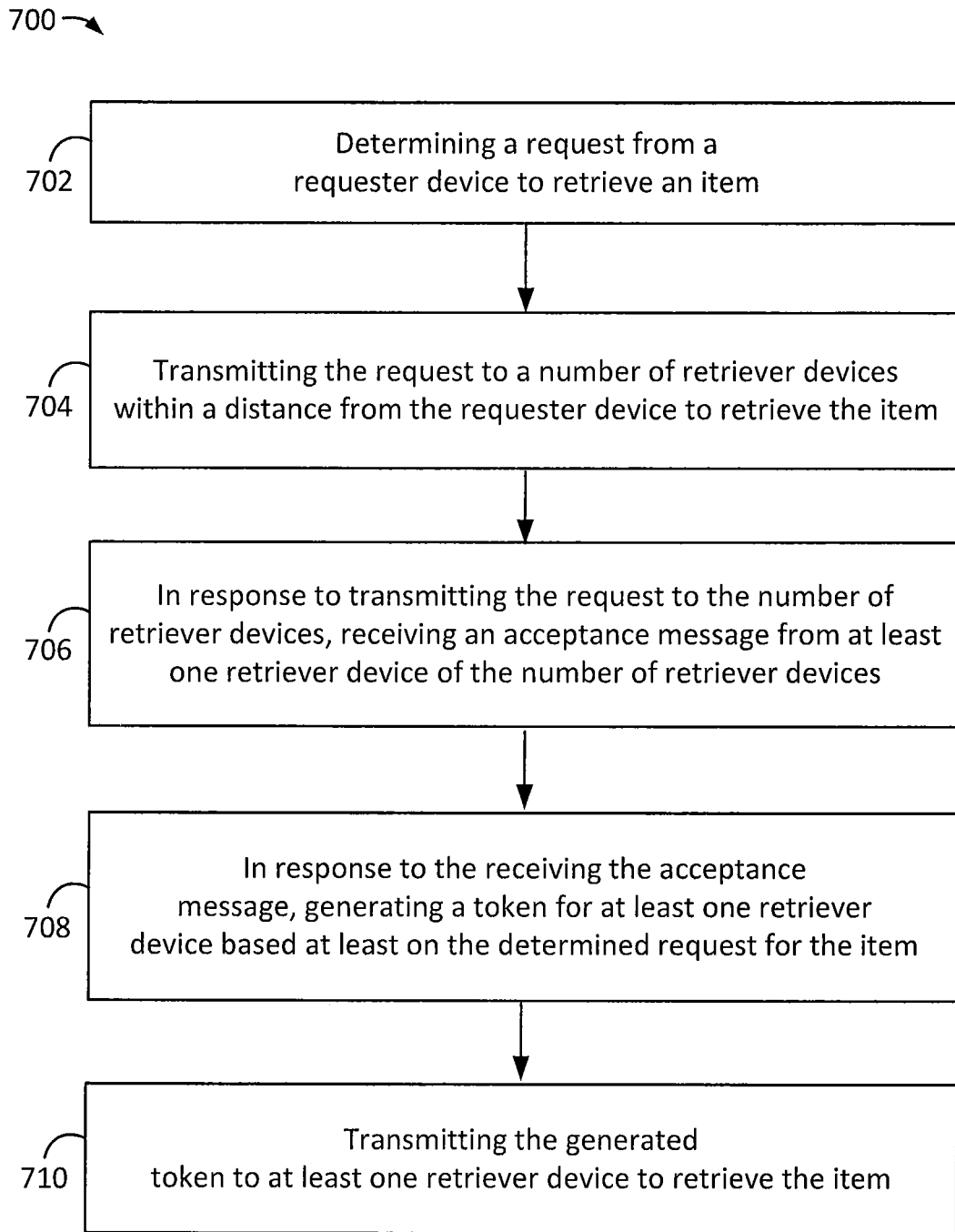
FIG. 7 illustrates an exemplary method, according to an embodiment.

FIG. 7 illustrates an exemplary method 700, according to an embodiment. Notably, one or more steps of the method 700, and/or other methods/processes described herein may be omitted, performed in a different sequence, and/or combined with other methods for various types of applications contemplated herein.

At step 702, the method 700 may include determining a request from a requester device to retrieve an item. For example, referring back to FIG. 6, the system 600 may determine the request 242 from the requester device 222 to retrieve the item 264 for the user 202, possibly from the kiosk device 208.

At step 704, the method 700 may include transmitting the request to a number of retriever devices within a distance from the requester device to retrieve the item. For example, referring back to FIG. 6, the system 600 may transmit the request 242 to a number of retriever devices 224 and/or 226 within one or more distances from the requester device 222 to retrieve the item 264. As shown in FIG. 6, the system 600 may transmit the request 242 to the retriever device 224 that is a distance 622 from the requester device 222. Yet, in some instances, the system 600 may transmit the request 242 to the retriever device 226 that is a distance 618 from the requester device 222. Further, the system 600 may transmit the request 242 to the retriever device 224 based on the distance 620 from the retriever device 224 to the kiosk device 208 and/or the retriever device 226. Yet, in some instances, the system 600 may transmit the request 242 to the retriever device 226 based on the distance 214 from the retriever device 226 to the kiosk device 208.

At step 706, the method 700 may include, in response to transmitting the request to the one or more retriever devices, receiving an acceptance message from at least one retriever device of the one or more retriever devices. For example, in response to transmitting the request 242 to the one or more retriever devices 224 and/or 226, the method 700 may include receiving an acceptance message, such as the messages 258 and/or 260 described above in relation to FIG. 2C, possibly from at least one retriever device of the one or more retriever devices 224 and/or 226. Notably, the system 600 based on one acceptance message 258, the other acceptance message 260 may be declined to prevent duplicate acceptances of the request 242.

At step 708, the method 700 may include, in response to the receiving the acceptance message, generating a token for at least one retriever device based at least on the determined request for the item. For example, in response to the receiving the acceptance message, such as the messages 258 and/or 260, the method 700 may include generating a token 252 for at least one of the retriever devices 224 and/or 226 based on the determined request 242 for the item 264.

At step 710, the method 700 may include transmitting the generated token to at least on retriever device to retrieve the item. For example, the method 700 may include transmitting the generated token 252 to one of the retriever devices 224 and/or 226 to retrieve the item 264. In such instances, the retriever device 224 or retriever device 226 may use the token 252, possibly in the form of a quick response (QR) code displayed by the respective devices and scanned by the kiosk device 208. Thus, the retriever device 224 or retriever device 226 that uses the token 252 to retrieve the item 264 first may receive the fee 270. Further, the retriever device 224 or 226 that tries to use the token 252 to after the item 264 has been retrieved may display a notification that indicates the failed attempt to retrieve the item 264 based on the item 264 already being retrieved with the token 252.

In some embodiments, the method 700 may include the determining the first distance 618 from the requester device 222 to a first retriever device 226 of a number of retriever devices 224, 226, and/or other possible retriever devices. Further, the method 700 may include determining a second distance 622 from the requester device 222 to the second retriever device 224 of number of retriever devices 224, 226, and/or other possible retriever devices. As such, the generated token 252 may be transmitted to the first retriever device 226 to retrieve the item 264 based on the first distance 618 and/or the second distance 622, possibly where the first distance 618 is shorter than the second distance 622.

In some embodiments, as noted, the method 700 may include determining a first retriever device 224 and a second retriever device 226. The method 700 may also include determining the first distance 622 from the requester device 222 to the first retriever device 224, a second distance 618 from the requester device 222 to the second retriever device 226, and a third distance 214 shown in FIG. 2C from the second retriever device 226 to the kiosk device 208. As such, the request 242 may be transmitted to the second retriever device 226 of the number of retriever device based on one or more distances from the first distance 622, the second distance 618, and the third distance 214. For example, the distance 214 may be shorter than any of the other distances 618, 620, and/or 622, such that the request 242 may be transmitted to the second retriever device 226 to retrieve the item 264 in the least amount of time.

In some embodiments, the method 700 may include establishing a chain communication with the requester device 222. For example, referring to FIG. 2B, there may be a first communication link 232 from the requester device 222 to the first retriever device 224 of the number of retriever devices. Further, there may be a second communication link 234 from the first retriever device 224 to the second retriever device 226 of the number of retriever devices. As such, the method 700 may include transferring the request 242 from the requester device 222 to the first retriever device 224 based on the chain communication 232, 234, 236, and/or 238. Further, the method 700 may include generating a second request 244 for a first ticket of the items 209 requested by the requester device 222 and a second ticket of the items 209 requested by the first retriever device 224 based on the chain communication 232, 234, 236, and/or 238. Further, the method 700 may include causing the first retriever device 224 to transfer the second request 244 to the second retriever device 226 based on the chain communication 232, 234, 236, and/or 238.

In some embodiments, referring back to FIG. 2C, the method 700 may include transferring a confirmation 262 to the second retriever device 226. The method 700 may also include causing the second retriever device 226 to transfer the confirmation 260 to the first retriever device 224 based on the chain communication 232, 234, 236, and/or 238. Yet further, the method 700 may include causing the first retriever device 224 to transfer the confirmation 258 to the requester device 22 based on the chain communication 232, 234, 236, and/or 238.

In some embodiments, the method 700 may include causing the second retriever device 226 to display the confirmation 262 described above in relation to FIG. 5, possibly associated with the first item 264, the second item 266, and the third item 268. The method 700 may also include causing the first retriever device 224 to display the confirmation 260 associated with the second item 266 based on the chain communication 232, 234, 236, and/or 238. The method 700 may also include causing the requester device 222 to display the confirmation 258 associated with the item 264 based on the chain communication 232, 234, 236, and/or 238.

In some embodiments, the number of retriever devices 224 and/or 226 may be configured to communicate with one or more cloud networks of the system 600. As such, the method 700 may include transmitting the request 242 to the number of retriever devices 224 and/or 226 by transmitting the request 242 to the number of retriever devices 224 and/or 226 with the one or more cloud networks.

As noted in the scenarios above, there may be a predetermined number of items that may be retrieved by a single user, possibly at a given time. As such, the method 700 may include determining a first number of items 264 requested by the requester device 222. The method 700 may also include determining a second number of items 266 requested by a first retriever device 224 of the number of retriever devices 224, 226, and/or other possible devices. The method 700 may also include determining a third number of items 268 requested by a second retriever device 226 of the number of retriever devices 224, 226, and/or other possible devices. As such, the method 700 may include transmitting the generated token 252 to the first retriever device 224 to retrieve the first number of items 264 and the second number of items 266 from the items 209 based on the first number of items 264 and the second number of items 266 amounting to less than a predetermined number of items, such as a limited number of items that may be issued by the kiosk device 208, for example.

Figure 8:
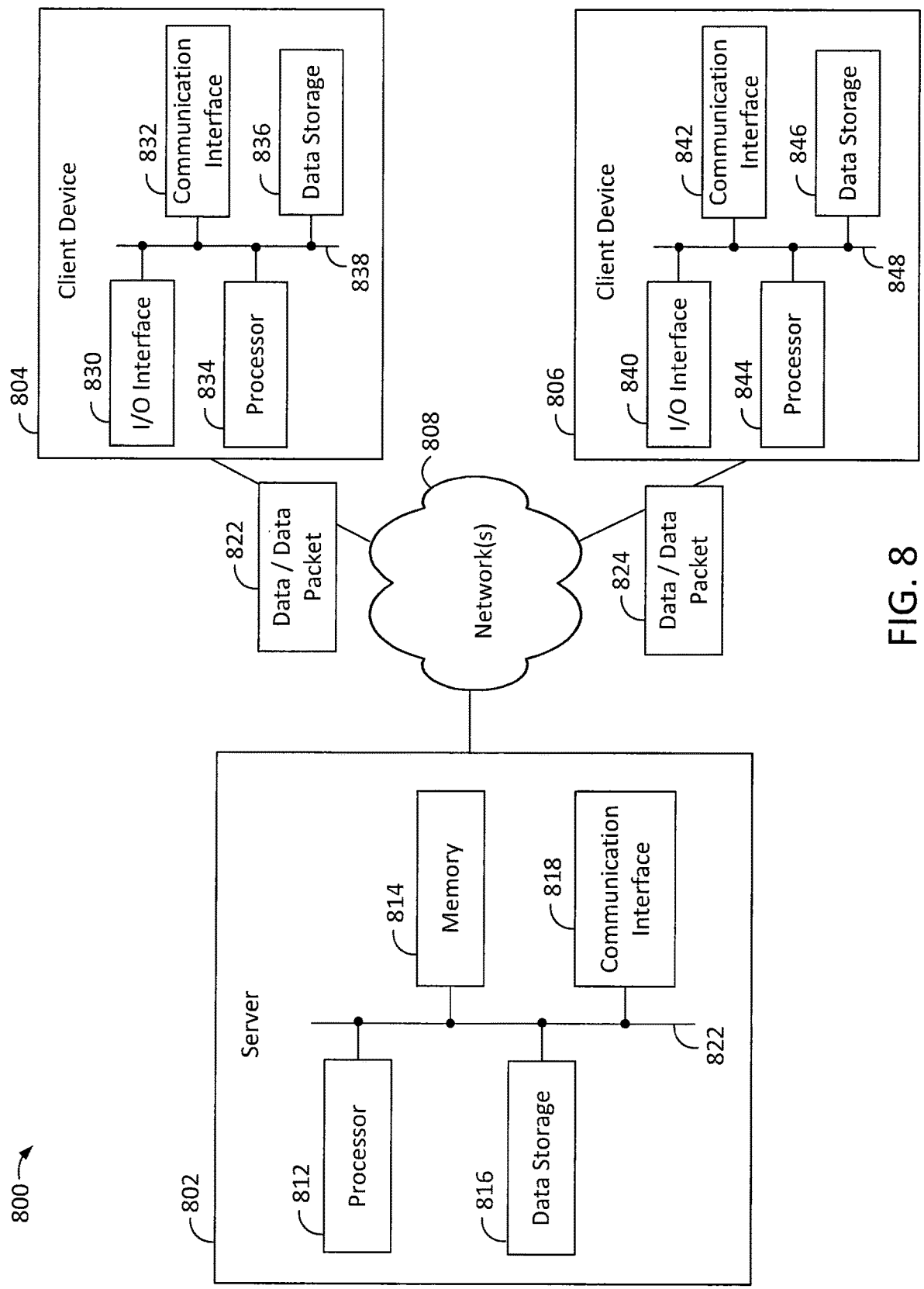
FIG. 8 illustrates an exemplary system, according to an embodiment.

FIG. 8 is a block diagram of an exemplary system 800, according to an embodiment. The system 800 may be configured to transfer data over one or more networks 808 of the system 800, where the one or more networks 808 may take the form of the cloud networks and/or base station networks described above in relation to FIGS. 1-7. In particular, the server 802, the client device 804, and/or the client device 806 may each be configured to communicate over the communication network 808. As shown, the system 800 includes multiple computing devices but may also include other possible computing devices. The server 802 may be configured to receive requests and determine retriever devices. The system 800 may operate with more or less than the computing devices shown in FIG. 8, where each device may be configured to communicate over one or more communication networks 808, possibly to transfer data accordingly. In some instances, the one or more communication networks 808 may include a data network and a cellular network, among other possible networks. In some instances, the communication network 808 may include web servers, network adapters, switches, routers, network nodes, base stations, microcells, and/or various buffers/queues to exchange data/data packets 822 and/or 824.

The server 802 may be configured to perform various operations in relation to the system 800. In some embodiments, the server 802 may be configured to receive a request from a client device, such as the client device 804, possibly also referred to as requester device 804. The server 802 may also determine one or more other devices, such as the client device 806, possibly also referred to the retriever device 806.

The data/data packets 822 and/or 824 may be transferrable via communication protocols such as Transmission Control Protocol/Internet Protocol (TCP/IP). In various embodiments, each of the data/data packets 822 and 824 may be assembled or disassembled into larger or smaller packets of varying sizes, such as sizes from 1,000 to 1,500 bytes, for example, among other possible data sizes. As such, data/data packets 822 and/or 824 may be transferrable over the network 808 and to various locations in the data infrastructure in the system 800.

In some embodiments, the server 802 may take a variety of forms. The server 802 may be an enterprise server, possibly operable with one or more operating systems to facilitate the scalability of the system and/or the data infrastructure 800. For example, the server 802 may operate with a Unix-based operating system configured to integrate with a growing number of other servers, client devices, and/or networks over various other systems. The server 802 may further facilitate the workloads associated with numerous data transfers and workloads in view of increasing requesting users and/or retrieving users in the data infrastructure system 800. In particular, the server 802 may facilitate the scalability of such increasing requesters and sources to eliminate data congestion, bottlenecks, and/or transfer delays.

In some embodiments, the server 802 may include multiple components, such as one or more processors 812, non-transitory memories 814, non-transitory data storages 816, and/or communication interfaces 818, among other possible components, any of which may be communicatively linked via a system bus, network, or other connection mechanism 822. The processor 812 may take the form of a multi-purpose processor, a microprocessor, a special purpose processor, a digital signal processor (DSP) and/or other types of processing components. For example, processor 812 may include a variable-bit (e.g., 64-bit) processor architecture configured for scalability and to execute varying instructions sets (e.g., simplified and complex instructions sets) with fewer cycles per instruction than other conventional general-purpose processors to improve performance of the server 802.

In some embodiments, the processor 812 may perform requester device operations and/or retriever device operations described above, such as generating the requests 242, 244, and/or 246. Further, the processor 812 may be configured to parse data packets 822 and receive a request from a client device, such as the requester device 804. As such, the processor 812 may identify other client devices, such as the retriever device 806. Referring back to FIGS. 1A-1C, the processor 812 may determine the request 112 for the one or more items 109 that is available from the kiosk device 108. Thus, the processor 812 may generate the request 112 based on the one or more distances 110 from the requester device 112 to the kiosk device 108, where the requester device 112 may take the form of the requester device 804. Further, processor 812 may communicate with the requester device 112 with packets 812 to cause the requester device 112 to transmit the request 112 to the retriever device 126, where the retriever device 126 may take the form of the retriever device 804, to request the user 106 to retrieve the one or more items 109 from the kiosk device 108. In some instances, the request 112 may be transmitted to the retriever device 126 based on the wireless signals 132 described above. As noted, the request 112 may be transmitted to the retriever device 126 within the distance 110 from the requester device 122 to the kiosk device 108.

The memory component 814 and/or the data storage 816 may include one or more volatile, non-volatile, and/or replaceable storage components, such as magnetic, optical, and/or flash storage that may be integrated in whole or in part with the processor 812. Further, the memory component 814 may include or take the form of a non-transitory computer-readable storage medium, having stored thereon computer-readable instructions that, when executed by the processing component 812, cause the server 802 to perform machine learning operations, such as those described in this disclosure and illustrated by the accompanying figures.

The communication interface or component 818 may take a variety of forms and may be configured to allow the server 802 to communicate with one or more devices, such as client devices 804 and/or 806, according to a number of protocols. For example, the communication interface 818 may include a transceiver that enables the server 802 to communicate with the client devices 804 and/or 806 via the one or more communication networks 808. Further, the communication interface 818 may include a wired interface, such as an Ethernet interface, and/or a wireless interface, such as a cellular interface configured to one or more protocols (e.g., GSM, CDMA, UMTS, EV-DO, WiMAX, or LTE) and/or microcell interface and/or a Wi-Fi interface. The wireless interface may also include interfaces operable to transfer data over short distances utilizing short-wavelength radio waves in approximately the 2.4 to 2.485 GHz range. In some instances, the communication interface 818 may send/receive data or data packets to/from client devices 804 and/or 806.

The client devices 804 and 806 may also be configured to perform a variety of operations such as those described in this disclosure and illustrated by the accompanying figures. In particular, client devices 804 and 806 may be configured to transfer data/data packets 822 and/or 824 with the server 802, that include requests to retrieve items described above, location data, GPS coordinate data, beacon data, WI-FI data, base station data, triangulation data, peer data, social media data, sensor data, movement data, temperature data, and/or other types of data described herein.

In some embodiments, the client devices 804 and 806 may include or take the form of a smartphone system, a personal computer (PC) (e.g., a laptop device), a wearable computer device, a head-mountable display (HMD) device, tablet computer device, a merchant device, a smart watch device, other types of wearable devices, and/or other types of computing devices configured to transfer data, among other possibilities. The client devices 804 and 806 may include various components, including, for example, input/output (I/O) interfaces 830 and 840, communication interfaces 832 and 842, processors 834 and 844, and data storages 836 and 846, respectively, all of which may be communicatively linked with each other via a system bus, network, or other connection mechanisms 838 and 848, respectively.

The I/O interfaces 830 and 840 may be configured to receive inputs from and provide outputs to one or more users of the client devices 804 and 806. For example, the I/O interface 830 may include a graphical user interface (GUI) configured to receive an input that indicates a request for retrieving items as described above. The GUI may also be configured to receive an input that indicates an acceptance of such requests. Thus, the I/O interfaces 830 and 840 may include input hardware with tangible surfaces such as touchscreens with touch sensitive sensors and/or proximity sensors. The I/O interfaces 830 and 840 may be synched with a microphone configured to receive voice commands, a computer mouse, a keyboard, and/or other input mechanics from the real world environment. In addition, I/O interfaces 830 and 840 may include output hardware such as touchscreen displays, a sound speaker, other audio output mechanism, a haptic feedback system, and/or other components.

In some embodiments, communication interfaces 832 and 842 may include or take a variety of forms. For example, communication interfaces 832 and 842 may be configured to allow client devices 804 and 806, respectively, to communicate with one or more devices according to a number of protocols. For instance, communication interfaces 832 and 842 may be configured to allow client devices 804 and 806, respectively, to communicate with the server 802 via the communication network 808. The processors 834 and 844 may include a multi-purpose processor, a microprocessor, a special purpose processor, a digital signal processor (DSP), an application specific integrated circuit (ASIC), a programmable system-on-chip (SOC), field-programmable gate array (FPGA), and/or other types of processing components.

The data storages 836 and 846 may include one or more volatile, non-volatile, removable, and/or non-removable storage components, and may be integrated in whole or in part with processors 834 and 844, respectively. Further, data storages 836 and 846 may include or take the form of non-transitory computer-readable mediums, having stored thereon instructions that, when executed by processors 834 and 844, cause the client devices 804 and 806 to perform operations, respectively, such as requester device and/or retriever device operations described in this disclosure and illustrated by the accompanying figures.

In some embodiments, the communication network 808 may be Used to transfer data between the server 802, the client device 804, the client device 806, and/or other computing devices associated with the data infrastructure system 800. The communication network 808 may be a packet-switched network configured to provide digital networking communications and/or exchange data of various forms, content, type, and/or structure. The communication network 808 may include a data network such as a private network, a local area network, and/or a wide area network. Further, the communication network 808 may include a cellular network with one or more base station and/or cellular networks of various sizes.

In some embodiments, the client device 804 may create a request possibly encoded with data/data packet 822 to establish a connection with the server 802. As such, the request may initiate a search of an internet protocol (IP) address of the server 802, that may, for example, take the form of the IP address, "192.168.1.102," for example. In some instances, an intermediate server, e.g., a domain name server (DNS) and/or a web server, possibly in the one or more networks 808 may identify the IP address of the server 802 to establish the connection between the client device 804 and the server 802. As such, the client device 804 may request the server 802 to determine one or more retriever devices 806 of users willing to retrieve items as described above.

It can be appreciated that the server 802 and the client devices 804 and 806 illustrated in FIG. 8 may be deployed in other ways. The operations performed and/or the services provided by such client devices 804 and 806 may be combined or separated for a given embodiment and may be performed by a greater number or a fewer number of devices. Further, one or more devices may be operated and/or maintained by the same or different entities. Yet, further each device may be associated with one or more accounts.

In some embodiments, an account, possibly also referred to a user account, may be a compilation of data associated with a given user. Some examples of accounts may include accounts with service providers described above and/or other types of financial, transactional, and/or e-commerce related accounts. Further, accounts may also include social networking accounts, e-mail accounts, smartphone accounts, music playlist accounts, video streaming accounts, among other possibilities. For example, an account for a particular user may include data related to the user, data related to the user's interest, and/or data representing the user. Further, the user may provide various types of data to the account via a user device, e.g., client devices 804 and/or 806.

The user account may be displayed on a client device, possibly through I/O interfaces 830 and/or 840 described above in relation to FIG. 8. Thus, the user account may be displayed on a smartphone system and/or any of the devices described herein to access the account. For example, the user may manage one or more of their accounts on client devices 804 and/or 806. In particular, the client device 804 may be used to generate, view, and/or send one or more requests to transfer funds from one account to another account, such as an account accessible by the client device 806.

In some embodiments, a user may have a single account such as an account with a service or payment provider described above representing the user for multiple other accounts. For example, the single user account may represent the user for other e-mail accounts, social networking accounts, smartphone accounts, as well as websites, applications, and/or other services. For example, a user could opt to use their account as a multi-purpose account for performing various operations, including communicating with numerous requesters and sources.

In some embodiments, a user account may be created by one or more users. For example, one account may be a family account where a number of family members or users may have access to the family account. In some instances, the account may be a corporate account, where employees, staff, worker personnel, and/or contractors, among other individuals may have access to the corporate account. Yet further, it should be noted that a user, as described herein, may be a robot, a robotic system, a computing device, a computing system, and/or another form of technology capable of transferring data and/or funds corresponding to the account. A user may be required to provide a login, a password, a code, an encryption key, authentication data, biometric data, and/or other types of data to access to the account.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A non-transitory machine-readable medium comprising instructions executable to cause a retriever device to perform operations comprising:
   receiving a request for one or more items from one or more requester devices based at least on a distance from the retriever device to a kiosk device;
   determining an acceptance to retrieve the one or more items from the kiosk device for one or more retrieval fees based at least on a user input received by the retriever device;
   transmitting an acceptance message to the one or more requester devices based at least on the user input received by the retriever device that indicates the acceptance to retrieve the one or more items from the kiosk device for the one or more retrieval fees; and
   displaying a confirmation based at least on the retrieval of the one or more items from the kiosk device, wherein the confirmation comprises one or more requester images that corresponds to the one or more requester devices.

2. The non-transitory machine-readable medium of claim 1, wherein the operations further comprise:
   generating a combined request comprising the request from the one or more requester devices and a retriever request for one or more second items from the kiosk device; and transmitting the combined request to the kiosk device based at least on a near field communication (NFC) with the kiosk device.

3. The non-transitory machine-readable medium of claim 1, wherein the operations further comprise:
determining a first token from the request for a first item from the one or more items; and
generating a second token for the acceptance message based at least on the determined first token, wherein the second token is configured to initiate a transaction for the first item and a second item, and
wherein the acceptance message comprising the second token is transmitted to the kiosk device to authorize the transaction for the first item and the second item.

4. The non-transitory machine-readable medium of claim 3, wherein generating the second token for the acceptance message comprises generating the second token with the first token encoded in the second token.

5. The non-transitory machine-readable medium of claim 1, wherein the request received from the one or more requester devices indicates a second request for a second item from a second requester device, wherein the operations further comprise:
determining a second acceptance to retrieve the second item from the kiosk device for a second retrieval fee based at least on the user input,
wherein the acceptance message is transmitted to the second requester device based at least on the second acceptance to retrieve the second item from the kiosk device for the second retrieval fee, and
wherein the confirmation displayed further indicates the retrieval of the second item from the kiosk device, and
wherein the one or more requester images comprises a second requester image associated with the second requester device.

6. The non-transitory machine-readable medium of claim 1, wherein the operations further comprise:
receiving the confirmation from the kiosk device based at least on the retrieval of the one or more items from the kiosk device; and
transmitting the confirmation to a proximate requester device of the one or more requester devices, wherein the transmitting to the proximate requester device causes a subsequent transmittal of the confirmation from the proximate requester device to a second proximate requester device.

7. A method, comprising:
determining a request from a requester device to retrieve an item;
transmitting the request to a plurality of retriever devices within a distance from the requester device to retrieve the item;
in response to transmitting the request to the plurality of retriever devices, receiving an acceptance message from at least one retriever device of the plurality retriever devices;
in response to the receiving the acceptance message, generating a token for the at least one retriever device based at least on the determined request for the item; and
transmitting the generated token to the at least one retriever device to retrieve the item.

8. The method of claim 7, wherein the plurality of retriever devices is configured to communicate with one or more cloud networks, and wherein transmitting the request to the plurality of retriever devices comprises transmitting the request to the plurality of retriever devices via the one or more cloud networks.

9. The method of claim 7, further comprising:
determining a first retriever device and a second retriever device; and
determining a first distance from the requester device to the first retriever device, a second distance from the requester device to the second retriever device, and a third distance from the second retriever device to a kiosk device,
wherein the request is transmitted to the second retriever device of the plurality of retriever devices based at least on one or more of the first distance, the second distance, and the third distance.

10. The method of claim 7, further comprising:
establishing a chain communication with the requester device, a first retriever device of the plurality of retriever devices, and a second retriever device of the plurality of retriever devices;
transferring the request from the requester device to the first retriever device based at least on the chain communication;
generating a second request for the item requested by the requester device and a second item requested by the first retriever device based at least on the chain communication; and
causing the first retriever device to transfer the second request to the second retriever device based at least on the chain communication.

11. The method of claim 10, further comprising:
transferring a confirmation to the second retriever device,
causing the second retriever device to transfer the confirmation to the first retriever device based at least on the chain communication, and
causing the second retriever device to transfer the confirmation to the requester device based at least on the chain communication.

12. The method of claim 10, further comprising:
causing the second retriever device to display a confirmation associated with the item and the second item;
causing the first retriever device to display a confirmation associated with the second item based at least on the chain communication; and
causing the requester device to display a confirmation associated with the item based at least on the chain communication.

13. The method of claim 7, further comprising:
determining a first number of items requested by the requester device; and
determining a second number of items requested by a first retriever device of the plurality of retriever devices,
wherein transmitting the generated token to the at least one retriever device comprises transmitting the generated token to the first retriever device to retrieve the first number of items and the second number of items based at least on the first number of items and the second number of items amounting to less than a predetermined number of items.

14. A system comprising:
a non-transitory memory; and
one or more hardware processors coupled to the non-transitory memory and configured to read instructions to cause the system to perform operations comprising:
determining a request from a requester device to retrieve an item;

transmitting the request to a plurality of retriever devices within a distance from the requester device to retrieve the item;

in response to transmitting the request to the plurality of retriever devices, receiving an acceptance message from at least one retriever device of the plurality retriever devices;

in response to the receiving the acceptance message, generating a token for the at least one retriever device based at least on the determined request for the item; and transmitting the generated token to the at least one retriever device to retrieve the item.

15. The system of claim 14, wherein the plurality of retriever devices is configured to communicate with one or more cloud networks, and wherein transmitting the request to the plurality of retriever devices comprises transmitting the request to the plurality of retriever devices via the one or more cloud networks.

16. The system of claim 14, the operations further comprising:

determining a first retriever device and a second retriever device; and determining a first distance from the requester device to the first retriever device, a second distance from the requester device to the second retriever device, and a third distance from the second retriever device to a kiosk device, wherein the request is transmitted to the second retriever device of the plurality of retriever devices based at least on one or more of the first distance, the second distance, and the third distance.

17. The system of claim 14, the operations further comprising:

establishing a chain communication with the requester device, a first retriever device of the plurality of retriever devices, and a second retriever device of the plurality of retriever devices;

transferring the request from the requester device to the first retriever device based at least on the chain communication;

generating a second request for the item requested by the requester device and a second item requested by the first retriever device based at least on the chain communication; and causing the first retriever device to transfer the second request to the second retriever device based at least on the chain communication.

18. The system of claim 17, the operations further comprising:

transferring a confirmation to the second retriever device, causing the second retriever device to transfer the confirmation to the first retriever device based at least on the chain communication, and causing the second retriever device to transfer the confirmation to the requester device based at least on the chain communication.

19. The system of claim 17, the operations further comprising:

causing the second retriever device to display a confirmation associated with the item and the second item;

causing the first retriever device to display a confirmation associated with the second item based at least on the chain communication; and causing the requester device to display a confirmation associated with the item based at least on the chain communication.

20. The system of claim 14, the operations further comprising:

determining a first number of items requested by the requester device; and determining a second number of items requested by a first retriever device of the plurality of retriever devices, wherein transmitting the generated token to the at least one retriever device comprises transmitting the generated token to the first retriever device to retrieve the first number of items and the second number of items based at least on the first number of items and the second number of items amounting to less than a predetermined number of items.

* * * * *